US010072554B2

(12) United States Patent
Plummer et al.

(10) Patent No.: US 10,072,554 B2
(45) Date of Patent: Sep. 11, 2018

(54) EMISSIONS CONTROL SYSTEMS AND METHODS

(71) Applicant: General Electric Company, Schenectady, NY (US)

(72) Inventors: Jessica Lynn Plummer, Erie, PA (US); Gail Leroy Detar, Erie, PA (US); Shashi Kiran, Erie, PA (US); Shridhar Shrikant Kulkarni, Erie, PA (US); Lawrence Heverley, III, Ripley, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/350,758

(22) Filed: Nov. 14, 2016

(65) Prior Publication Data
US 2017/0058750 A1 Mar. 2, 2017

Related U.S. Application Data

(63) Continuation of application No. 13/518,122, filed as application No. PCT/US2010/061681 on Dec. 21, 2010, now Pat. No. 9,494,083.

(Continued)

(51) Int. Cl.
*B60K 13/04* (2006.01)
*F01N 13/00* (2010.01)
(Continued)

(52) U.S. Cl.
CPC ....... *F01N 13/002* (2013.01); *B01D 46/0002* (2013.01); *B01D 46/002* (2013.01); *B01D 46/0027* (2013.01); *F01N 3/021* (2013.01); *F01N 3/0222* (2013.01); *F01N 3/0256* (2013.01); *F01N 3/208* (2013.01); *F01N 3/2066* (2013.01); *F01N 3/2803* (2013.01); *F01N 9/002* (2013.01); *F01N 13/0097* (2014.06); *F01N 13/017* (2014.06); *F01N 13/02* (2013.01); *F01N 13/04* (2013.01); *F01N 13/08* (2013.01); *F01N 13/18* (2013.01); *F01N 13/1805* (2013.01);
(Continued)

(58) Field of Classification Search
CPC ............. F01N 13/1805; F01N 13/1811; F01N 13/1822; F01N 2590/08; B60K 13/04
See application file for complete search history.

(56) References Cited

U.S. PATENT DOCUMENTS 4,060,143 A * 11/1977 Matsumoto ............ B60K 13/04
180/296
5,832,726 A * 11/1998 Rees ....................... F01N 13/08
181/243
(Continued)

*Primary Examiner* — Jonathan Matthias
(74) *Attorney, Agent, or Firm* — GE Global Patent Operation; John A. Kramer

(57) ABSTRACT

Methods and systems are provided related to an emissions control system. The emissions control system has an exhaust after-treatment system defining a plurality of distinct exhaust flow passages through which at least a portion of an exhaust stream can flow, e.g., the exhaust stream is produced by an engine. The emissions control system also includes a controller for controlling injection of reductant into the exhaust stream flowing through each of the flow passages. In one example, the emissions control system is configured for use in a vehicle, such as a locomotive or other rail vehicle.

15 Claims, 27 Drawing Sheets

Related U.S. Application Data

(60) Provisional application No. 61/288,841, filed on Dec. 21, 2009.

(51) Int. Cl.

| | | |
|---|---|---|
| *F01N 3/022* | (2006.01) | |
| *F01N 3/025* | (2006.01) | |
| *F01N 3/20* | (2006.01) | |
| *F01N 3/28* | (2006.01) | |
| *F01N 9/00* | (2006.01) | |
| *F01N 13/02* | (2010.01) | |
| *F01N 13/04* | (2010.01) | |
| *F01N 13/08* | (2010.01) | |
| *F01N 13/18* | (2010.01) | |
| *F02C 9/16* | (2006.01) | |
| *B01D 46/00* | (2006.01) | |
| *F01N 3/021* | (2006.01) | |
| *F02B 61/00* | (2006.01) | |
| *B01D 53/94* | (2006.01) | |
| *F02D 41/04* | (2006.01) | |
| *F02D 41/08* | (2006.01) | |

(52) U.S. Cl.
CPC ............... *F02B 61/00* (2013.01); *F02C 9/16* (2013.01); *B01D 53/9477* (2013.01); *B01D 2267/30* (2013.01); *B01D 2267/70* (2013.01); *B01D 2279/30* (2013.01); *F01N 2590/08* (2013.01); *F01N 2610/02* (2013.01); *F01N 2610/03* (2013.01); *F01N 2610/10* (2013.01); *F01N 2610/1406* (2013.01); *F01N 2610/1433* (2013.01); *F02D 41/045* (2013.01); *F02D 41/083* (2013.01); *Y02T 10/24* (2013.01); *Y02T 10/47* (2013.01)

(56) References Cited

U.S. PATENT DOCUMENTS

2010/0031644 A1* 2/2010 Keane .................... B60K 13/04 60/295
2010/0275588 A1* 11/2010 Kamata ................ B60K 5/1208 60/322

* cited by examiner

EMISSIONS CONTROL SYSTEMS AND METHODS

FIELD

The subject matter disclosed herein relates to vehicle emissions control systems and methods of operating emissions control systems.

BACKGROUND

Internal combustion engines generate various combustion by-products in the exhaust gas during the course of engine operation. Under some conditions, it may be desirable to control the production (amount, rate, etc.) of one or more selected exhaust components. For example, under some conditions, to meet stringent emissions criteria, it may be desirable to control the production of NOx species and/or particulate matter (PM) in the exhaust gas.

Various engine configurations, fuel types, additives, and exhaust after-treatment systems have been developed. As such, it may be desirable to provide additional improvements in controlling the emission of exhaust components. Furthermore, it may be desirable to design an emissions control system so that it can be installed in various vehicle systems without losing emissions performance.

BRIEF DESCRIPTION

In one embodiment, an emissions control system includes an exhaust after-treatment system defining a plurality of distinct exhaust flow passages through which at least a portion of an exhaust stream can flow, e.g., the exhaust stream is produced by a vehicle engine or other engine. The emissions control system further includes a control module that is configured to control the exhaust after-treatment system for injecting an amount of reductant into the exhaust stream flowing through each of the exhaust flow passages. By dividing the exhaust flow into a plurality of exhaust flow passages, and by adjusting the configuration of the emissions control system so that the plurality of exhaust flow passages can be mounted on the engine and better accommodated in various vehicle systems, the design of the exhaust after-treatment system can be improved without degrading the emissions performance of the vehicle system.

DRAWINGS

The present invention will be better understood from reading the following description of non-limiting embodiments, with reference to the attached drawings, wherein below:

Figure 3:
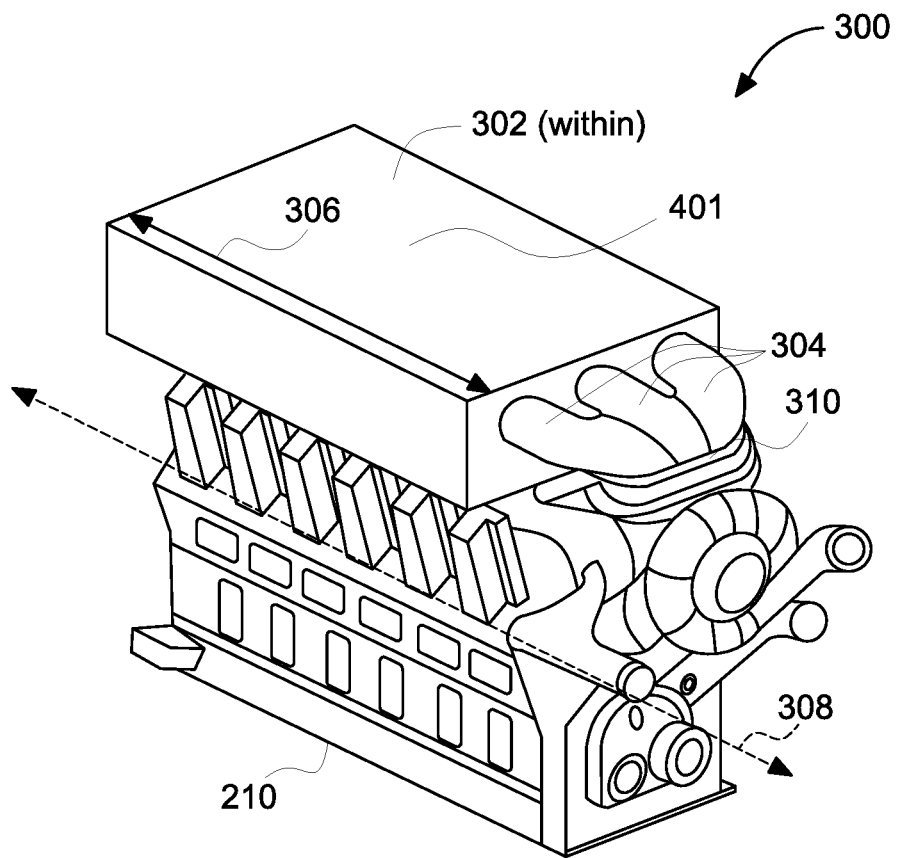
FIG. 3 shows a multi-leg emissions control system according to the present disclosure.
Figure 9A:
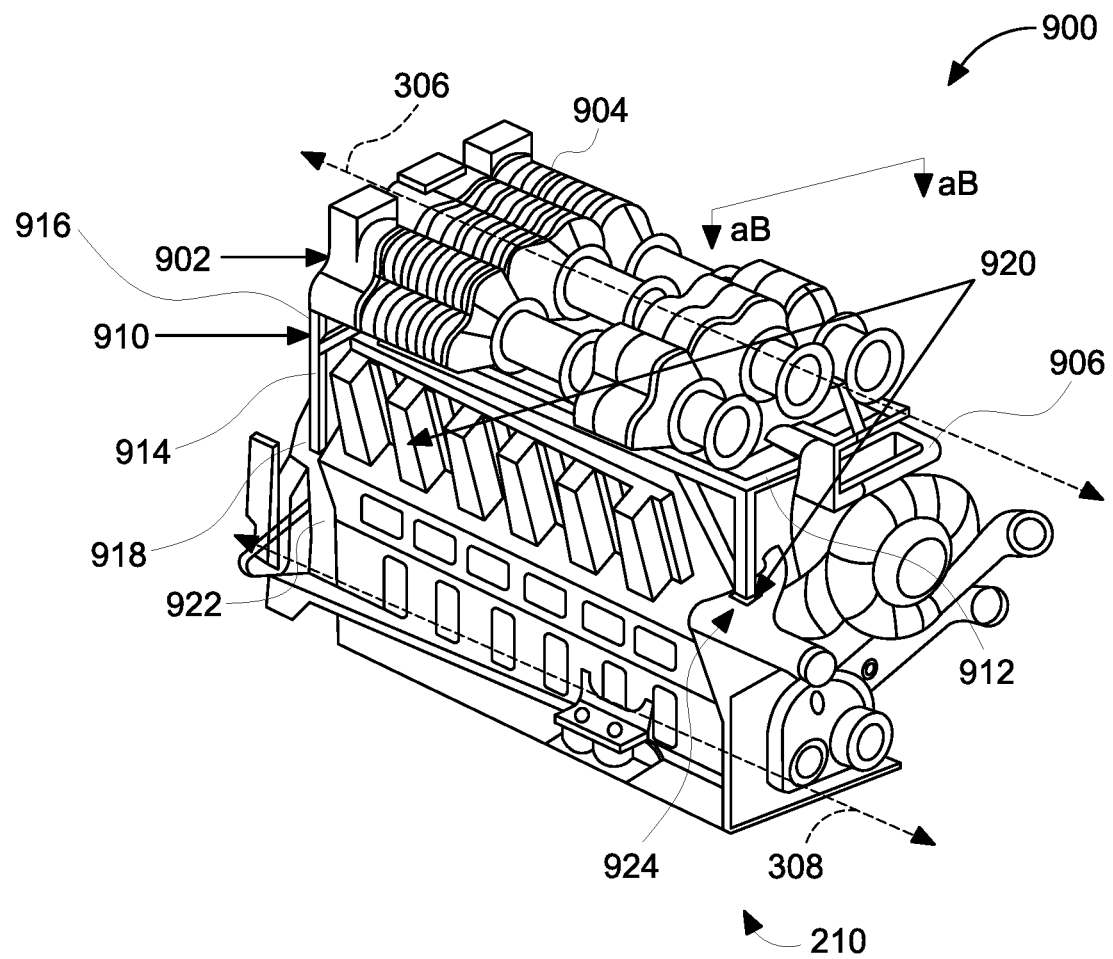
Figure 9B:
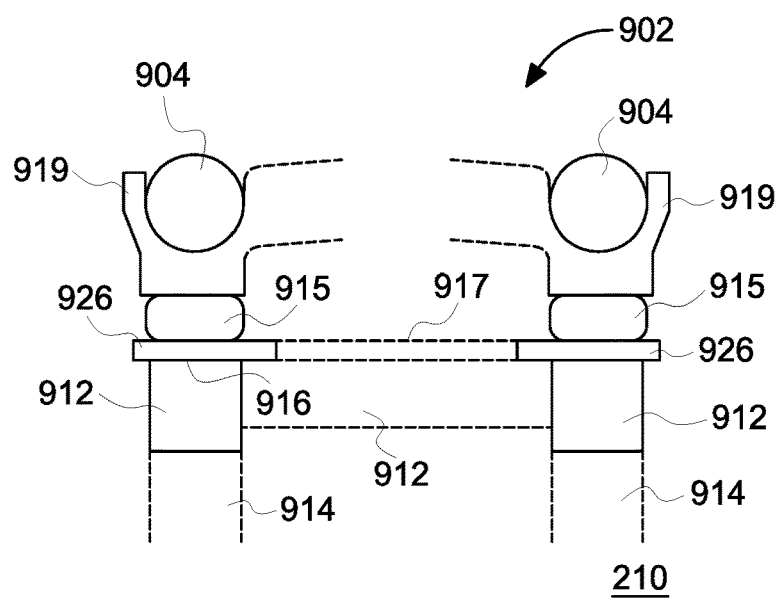
Figure 9C:
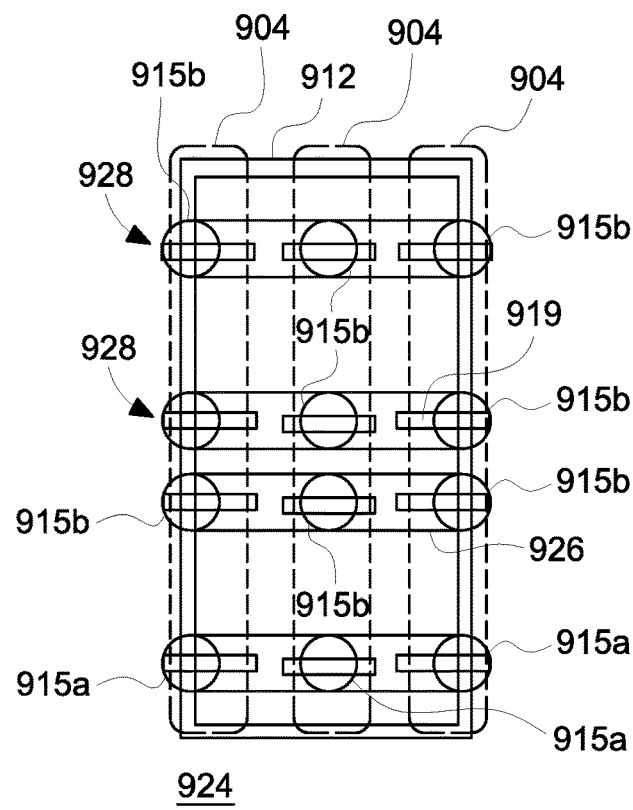
Figure 10:
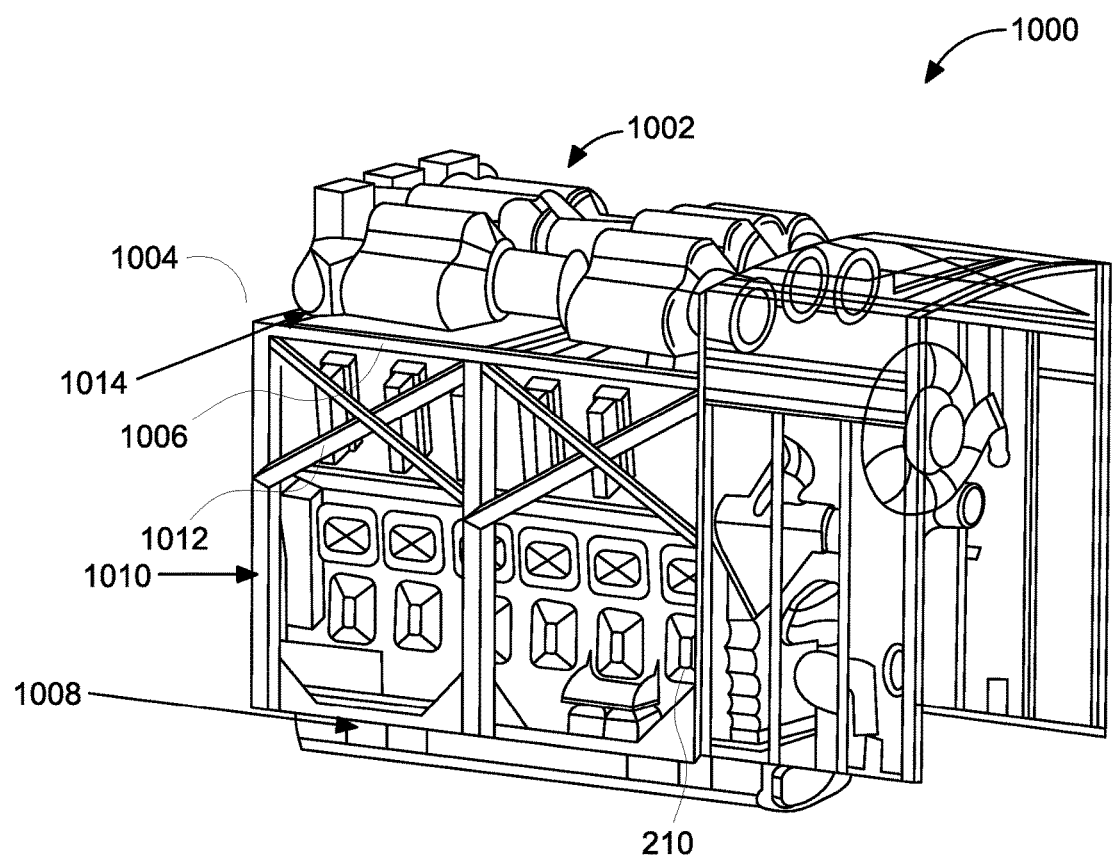
Figure 11:
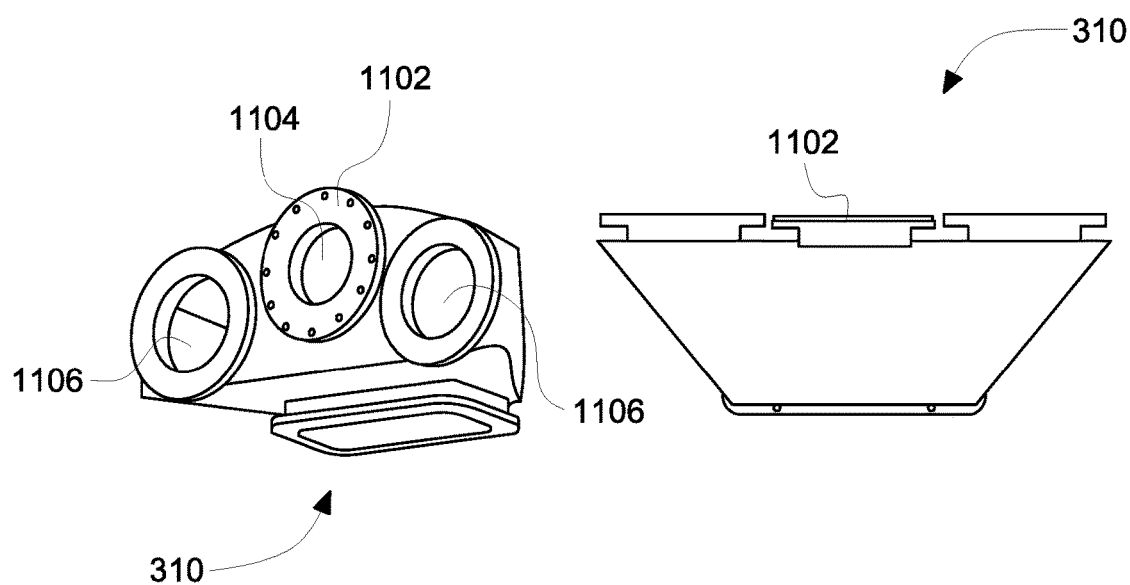
Figure 16A:
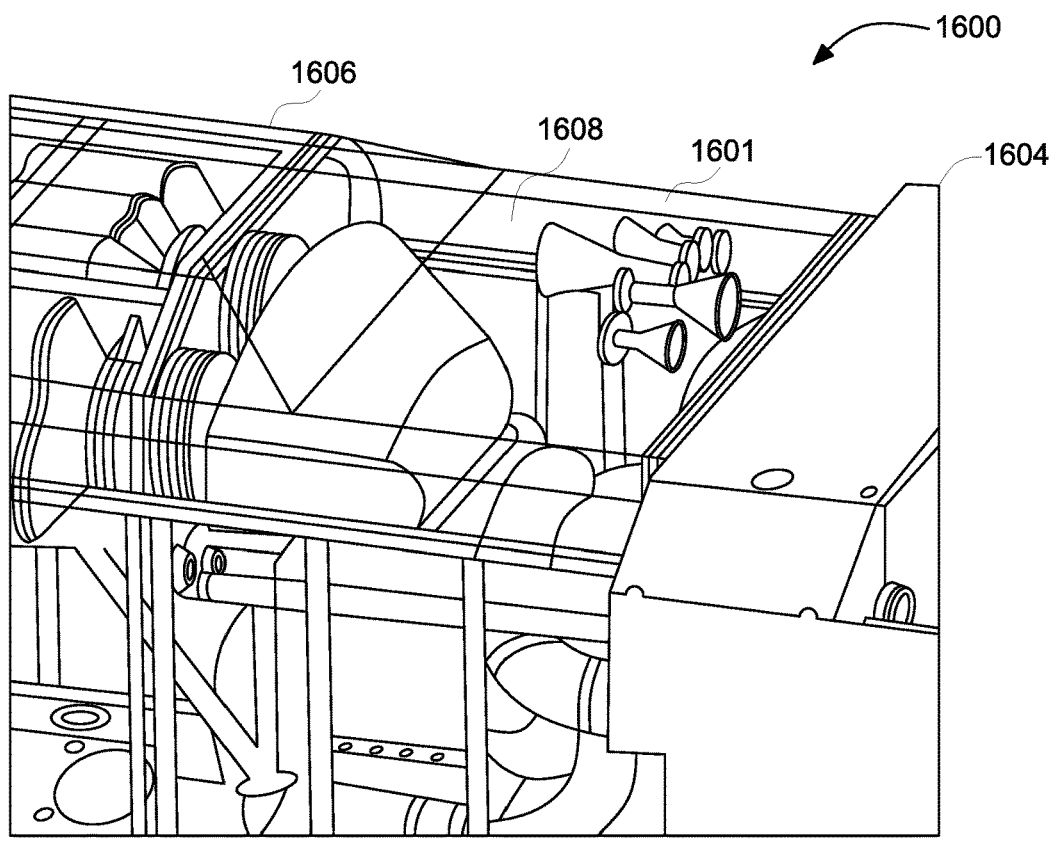
Figure 16B:
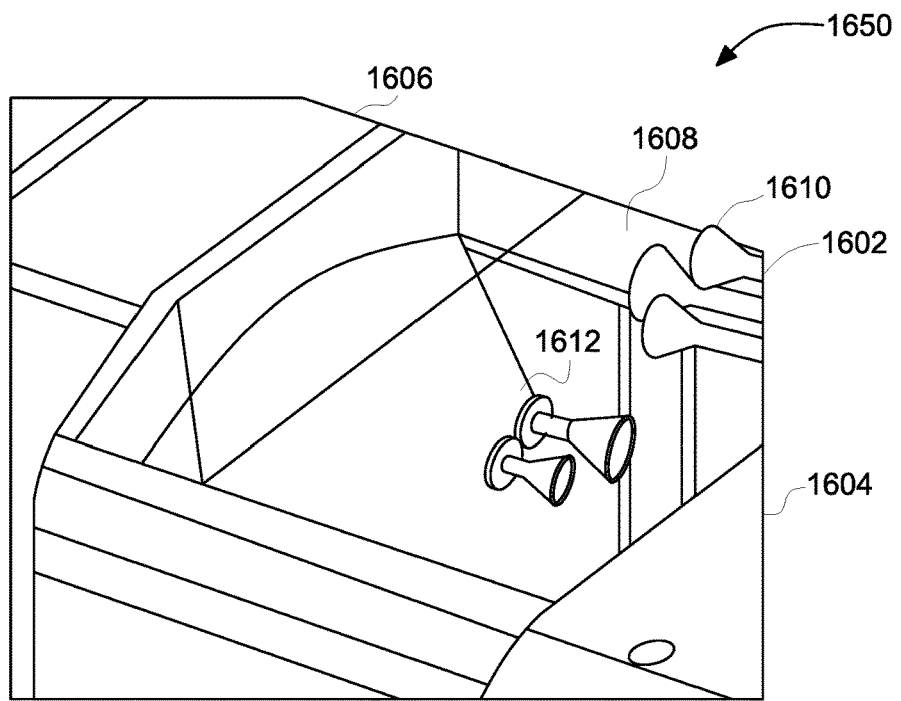
Figure 18:
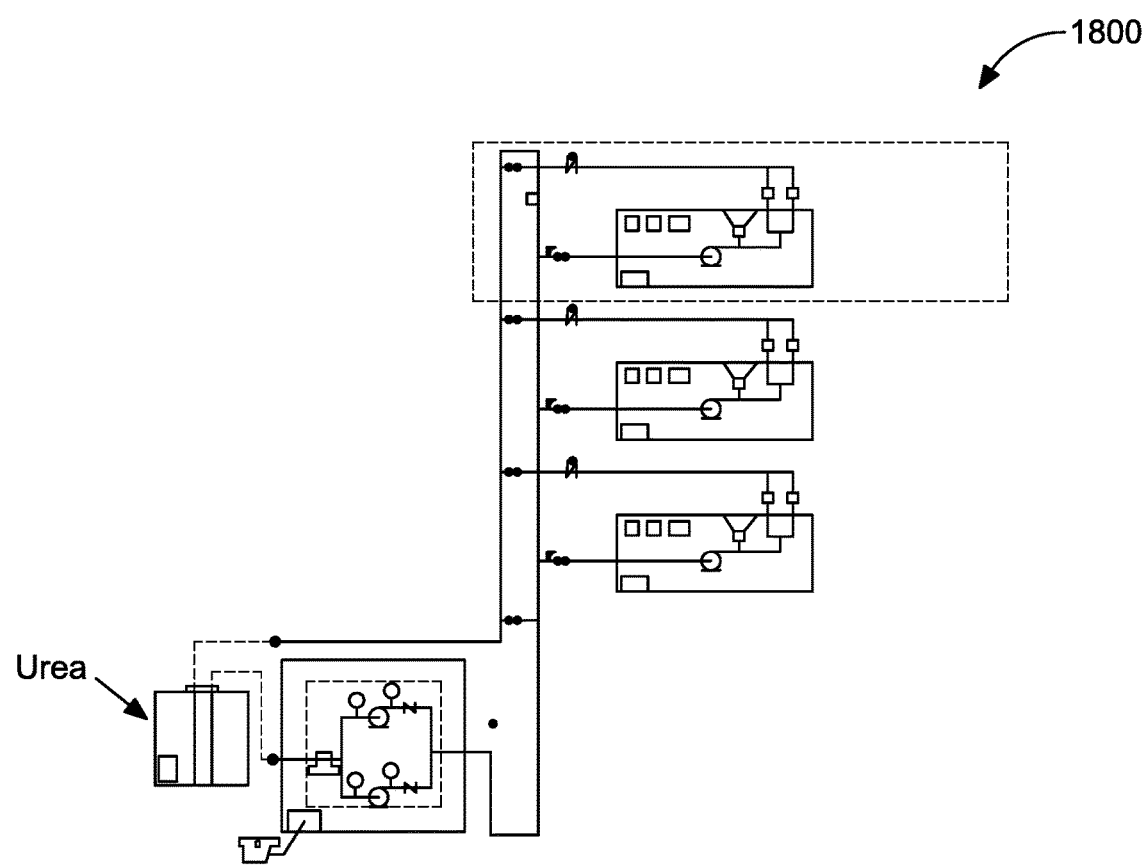
Figure 19:
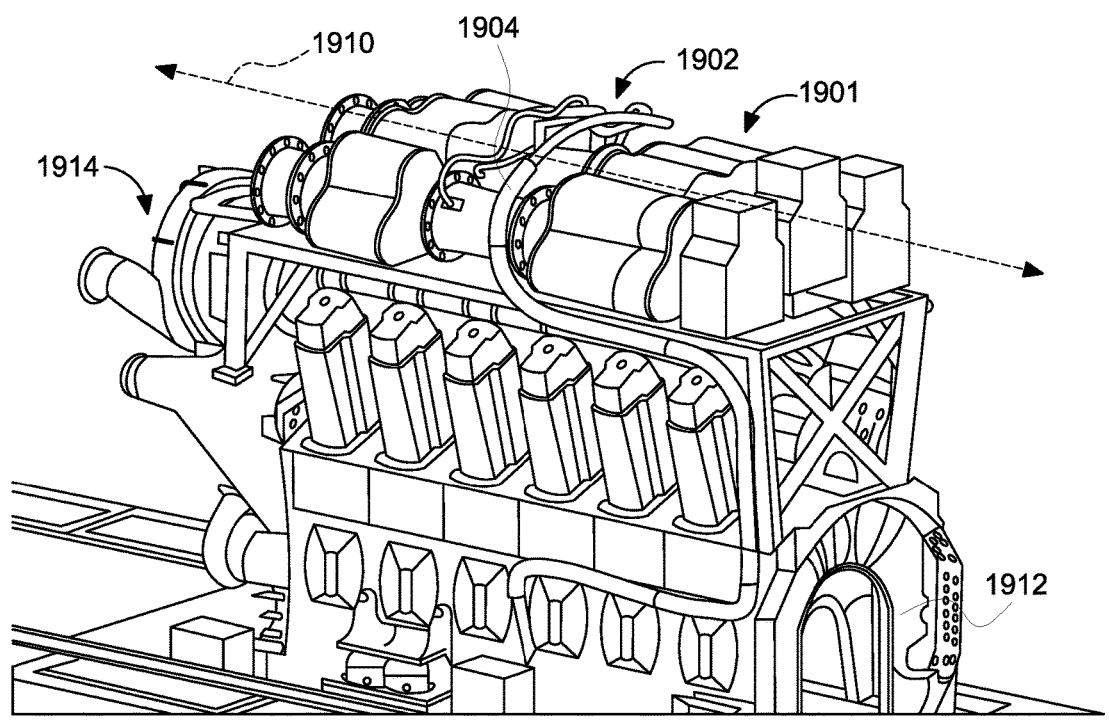
Figure 24:
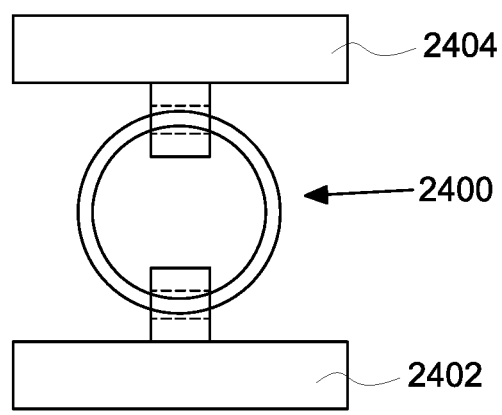
Figure 25:
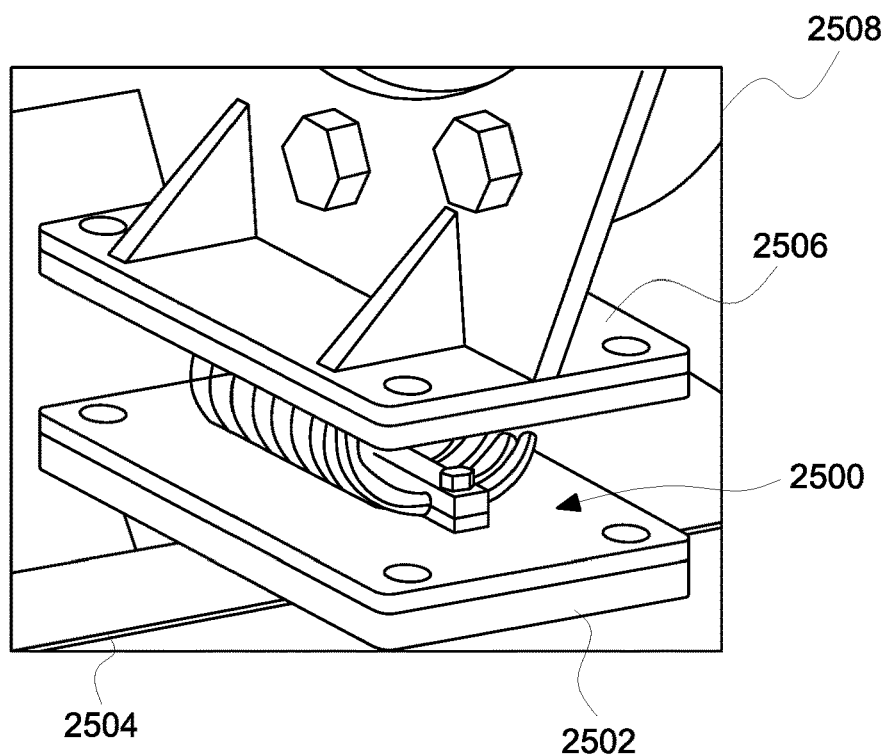
Figure 26:
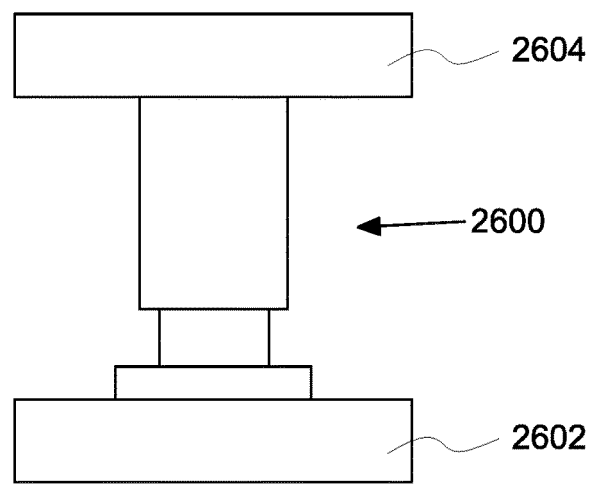

FIG. 9A shows an example embodiment of an engine mounted support structure for the emissions control system; FIG. 9B is a partial cross-section view (not to scale) taken along line 9B-9B in FIG. 9A, according to another embodiment; FIG. 9C is a top plan view of an engine mounted support structure, according to another embodiment;

FIG. 10 shows an example embodiment of a platform mounted support structure for the emissions control system;

FIG. 11 shows an example embodiment of restrictions that may be included in the middle leg of the emissions control system of FIG. 3;

FIGS. 12-15 show example engine cab configurations;

FIGS. 16A-16B show example embodiments of locomotive horn systems;

FIGS. 17A-17F show various embodiments of a urea tank walkway system, according to embodiments of the invention;

FIG. 18 is a schematic diagram of a multi-pump urea delivery system;

FIG. 19 is a perspective view of a reductant delivery system;

FIGS. 20-23 and 27 are schematic diagrams of several emissions control systems, according to other embodiments;

FIGS. 24-26 are various views of several embodiments of isolator elements; and

Figure 28:
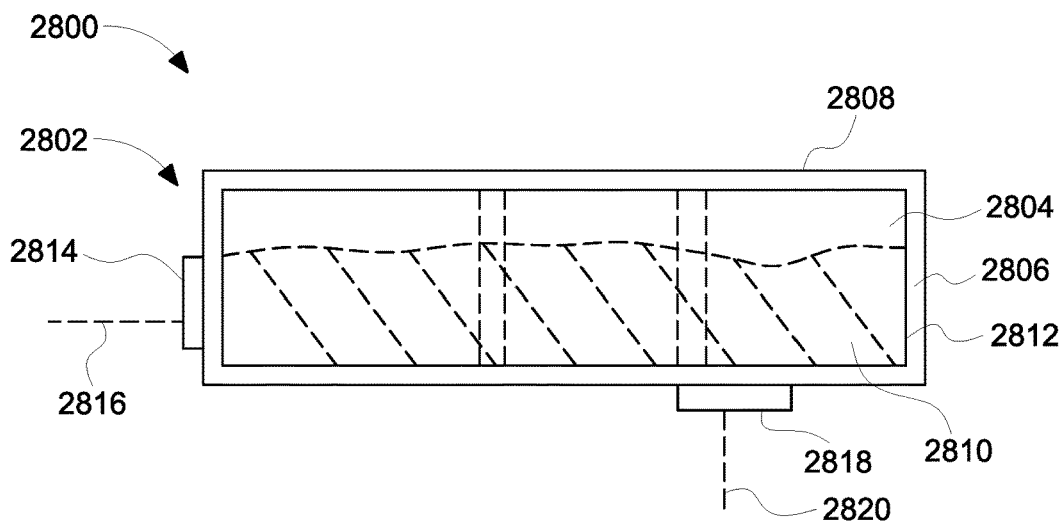

FIG. 28 is a schematic diagram of a vehicle system having a walkway with reductant storage tank, according to another embodiment.

DETAILED DESCRIPTION

The methods and systems described herein relate to emissions control systems including an exhaust after-treatment system. In some embodiments, the invention relates to an emissions control system that may be configured for an engine in a vehicle. In other embodiments, the invention relates to methods of operating such an emissions control system. In still other embodiments, the invention relates to vehicles having the described emissions control system. With regard to the vehicle, any mobile asset capable of producing an exhaust stream may utilize one or more aspects of the described invention. As a non-limiting example, a rail embodiment is disclosed herein. That is, the vehicle emissions control system is described in the context of a locomotive or other rail vehicle to facilitate the illustration of several aspects of the invention. It will be appreciated that in alternate embodiments, for example, where the vehicle is a railcar, aircraft, automobile, or marine vessel, several of the constraints that may apply to a locomotive may not be applicable. However, the locomotive environment is sufficiently challenging, such that many of the inventive aspects of the described emissions control system can be showcased.

The designs of the emissions control system shown herein attempt to balance and optimize multiple factors. As such, emphasis is given to those designs that may be incorporated in vehicle embodiments with the least impact. For example, in rail embodiments, emphasis is given to designs that have reduced impact on locomotive performance, operating costs, and maintenance costs.

Figure 1:
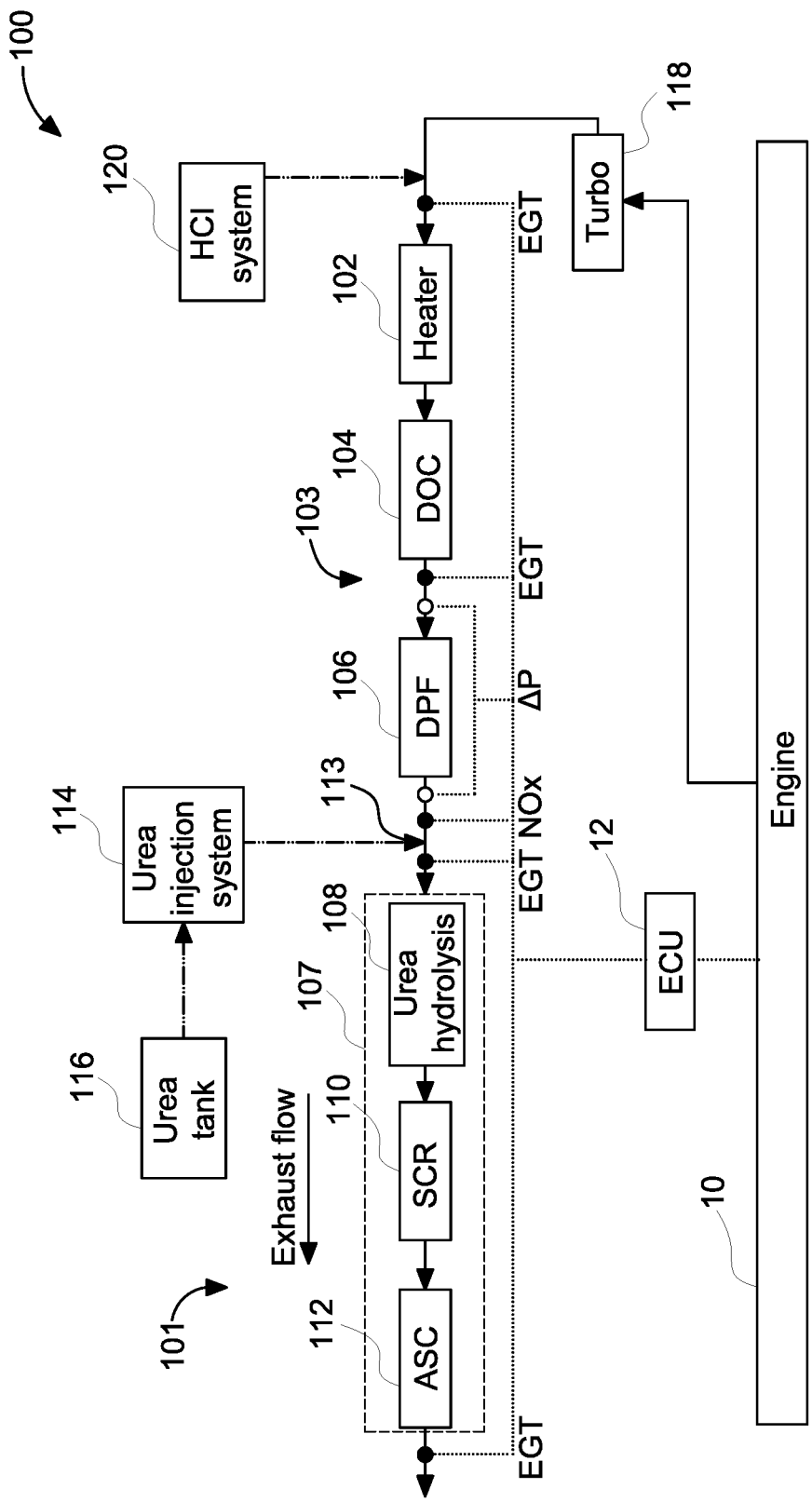
FIG. 1 is a schematic diagram of an emissions control system according to an embodiment of the invention.

FIG. 1 illustrates a schematic diagram of an emissions control system 100, in accordance with an embodiment of the invention. The emissions control system 100 includes an exhaust after-treatment system 101 coupled to (or configured to be coupled to) the exhaust manifold of an engine 10. The engine 10 is capable of producing an exhaust stream. A control module 12, such as engine control unit ("ECU"), is configured with computer readable instructions (or otherwise configured) to adjust the operation of various components (elaborated herein) of the exhaust after-treatment system 101. The various exhaust after-treatment components of the exhaust after-treatment system 101 address the various combustion by-products released in the exhaust stream during operation of the engine 10. As shown in, and further elaborated with reference to, FIG. 3, the exhaust after-treatment system 101 may define a plurality of distinct, and in-line, exhaust flow passages through which at least a portion of the exhaust stream, received from engine 10, can flow. (The exhaust flow passages and/or structure defining the passages are also referred to herein as "legs." A passage, the structure defining the passage, and exhaust after-treatment component(s) associated with the passage are sometimes referred to herein collectively as an "exhaust after-treatment unit;" thus, teachings or description herein relating to the legs specifically are also applicable to the exhaust treatment units.) The plurality of exhaust flow passages are positioned in parallel (or generally parallel) to each other. Furthermore, each of the plurality of exhaust flow passages may include each of the various exhaust after-treatment components discussed herein. In one example, as depicted, the engine 10 may be a boosted engine including a turbocharger 118 ("Turbo"), coupled between an intake manifold and exhaust manifold of the engine. The turbocharger 118 may be configured to provide a boosted aircharge to improve engine performance. Engine 10 may be located within any suitable vehicle, such as a locomotive, aircraft, railcar, automobile, marine vessel, etc., or it may be part of a power generator or other stationary application.

In an embodiment, in each of the plurality of exhaust flow passages, the exhaust after-treatment system 101 includes a selective catalytic reduction ("SCR") system 107 for reducing NOx species generated in the engine exhaust stream, and a particulate matter ("PM") reduction system 103 for reducing an amount of particulate matter generated in the engine exhaust stream. The various exhaust after-treatment components included in PM reduction system 103 include a diesel oxidation catalyst 104 ("DOC"), a diesel particulate filter 106 ("DPF"), and an optional burner or heater 102. The various exhaust after-treatment components included in the SCR system 107 include an SCR catalyst 110, an ammonia slip catalyst 112 ("ASC"), and/or a reductant component 108, such as a structure or region, for injecting, evaporating, mixing, and/or hydrolyzing an appropriate reductant used with the SCR catalyst, e.g., urea hydrolysis. The reductant component 108 may receive the reductant from a reductant storage tank 116 (e.g., urea tank) and urea or other reductant injection system 114.

Returning to the PM reduction system 103, the diesel particulate filter (DPF) 106 is configured to filter and remove particulate matter (PM) from the engine exhaust stream. Based on the PM load of the filter, the DPF 106 is periodically regenerated, for example, by burning off the stored PM, to restore the filter's PM storage capacity. In some embodiments, the DPF 106 may be optionally coupled to a regeneration device to assist in the periodic regeneration. For example, where the DPF 106 is a wall-flow type filter, and/or a ceramics-based filter, an appropriate regeneration device, such as the burner or heater 102, may be coupled to the particulate filter. Herein, burner or heater 102 may be configured to increase the temperature of the exhaust directed through DPF 106, for example, to a PM burn-out temperature. In another example, where the DPF 106 is a flow-through filter, and/or a metallics-based filter, an additional regeneration device may not be required. Example embodiments of a PM reduction system configured with and without an associated burner or heater are discussed herein with reference to FIGS. 6A-6B. A PM load of the DPF 106 may be inferred based on engine operating conditions, such as an air-to-fuel ratio of the exhaust gas, duration of engine operation, etc. Alternatively, the PM load of DPF 106 may be estimated based on a pressure difference, across the particulate matter filter, as sensed by one or more pressure sensors coupled to the filter. Based on the estimated PM load, a control module may determine a regeneration timing and duration.

Diesel oxidation catalyst (DOC) 104 is coupled upstream of the DPF 106, in the direction of exhaust flow (as indicated by an arrow labeled "Exhaust flow"). DOC 104 catalytically reduces the amount of particulate matter in the exhaust gas that is directed into the DPF 106. Specifically, by using one or more catalysts, such as palladium and platinum, exhaust PM is oxidized into carbon dioxide at DOC 104. As such, the DOC 104 may also oxidize other hydrocarbons and carbon monoxide present in the engine exhaust into carbon dioxide and water. By positioning DOC 104 upstream of DPF 106, the PM load experienced by DPF 106 can be reduced, thereby reducing the frequency of filter regeneration.

SCR system 107, coupled downstream of the DPF 106 portion of the PM reduction system 103, is configured to reduce exhaust NOx species. Specifically, exhaust NOx species are catalytically reduced by SCR catalyst 110 into nitrogen and water. The SCR system 107 includes a reductant injector for injecting an amount of an appropriate SCR reductant (e.g., urea) from a common reductant storage tank 116 (e.g., a urea tank) into an injection site 113 in a given exhaust flow passage upstream of SCR catalyst 110. By coupling the SCR catalyst 110 downstream of injection site 113, the injected reductant may be appropriately mixed and hydrolyzed in structure (or region) 108 before being absorbed on SCR catalyst 110. In rail and other diesel embodiments, the SCR reductant may be, or include, urea. For example, the reductant may be a diesel exhaust fluid (DEF), which is a solution of water and urea. However, in alternate embodiments, the reductant may be, for example, ammonia.

The reductant, e.g., urea, is stored in a common reductant storage tank 116, e.g., a urea storage tank, and delivered into the exhaust flow of each of the plurality of passages of the exhaust after-treatment system 101 via urea (or other reductant) injection system 114. The injection system, as elaborated below, may include various delivery and return lines, pumps, filters, and reductant injectors. Before use as a reductant, urea is hydrolyzed (into ammonia and carbon dioxide) in urea mixing and hydrolysis structure (or region) 108. The ammonia absorbed on SCR catalyst 110 is used to reduce exhaust NOx species. Any excess ammonia that slips from SCR catalyst 110 is absorbed and broken down by ammonia slip catalyst 112, thereby reducing the ammonia content of exhaust emissions. Example embodiments of a reductant storage tank and injection system that can be used with the exhaust after-treatment system 101 of FIG. 1 are described herein with reference to FIGS. 17-19.

A control module, such as engine control unit (ECU) 12, may receive sensor and communication signals from various sensors, such as thermocouples, pressure transducers, reductant (e.g., urea) level sensors, one or more NOx sensors, temperature sensors, etc., positioned at various locations along the exhaust after-treatment system. Based on the received sensor signals, the ECU 12 may operate one or more actuators to adjust exhaust after-treatment system components. For example, the ECU 12 may receive input, from one or more temperature sensors, regarding an exhaust gas temperature (EGT) at one or more locations in the emissions control system, such as, upstream of heater 102, upstream and downstream of DPF 106, and/or upstream and downstream of SCR system 107. In one example, the exhaust gas temperature may be used to determine when, and for how long heater or burner 102 should be operated. In another example, the ECU 12 may receive an input regarding a pressure difference (ΔP) across diesel particulate filter and may infer a PM load of the filter based on the estimated pressure difference. The control module may use the inferred PM load to determine when to initiate a filter regeneration operation. In yet another example, the ECU 12 may receive an input, such as a signal from a NOx sensor, regarding a NOx level in the exhaust gas upstream of the SCR system 107. Based on the indicated NOx level (e.g., as provided by the NOx sensor), the control module may adjust an amount of reductant (e.g., urea) injection. In still another example, the control module may determine a duration of engine operation to periodically schedule a cleaning of the emissions control system. In one example, where the engine is in a locomotive, the locomotive may be periodically cleaned using hydro carbon injection (HCI) from HCI-based cleaning system 120.

In another example, where the exhaust after-treatment system includes a plurality of exhaust flow passages, the control module may be configured with code for dividing an exhaust stream from an engine into a plurality of sub-streams, injecting a respective amount of reductant into each of the plurality of sub-streams (that is, each sub-stream is injected with its own amount of reductant), and chemically altering a determined chemical component of the exhaust stream in response to the injected reductant, wherein at least one of the plurality of sub-streams is routed in a direction different from (e.g., opposite from) a routing direction of one other of the plurality of sub-streams.

The exhaust after-treatment system 100 may similarly receive signals from a switch box and controller area network (CAN) communications from the ECU 12. The exhaust after-treatment system may also communicate back to the ECU 12 and send response signals. In one example, a response signal may include a malfunction indication lamp (MIL) signal communicated to a switch box, or indicator box. In another example, the controls may include controlling the SCR system, for example, by controlling circulation, drainage, injection, and/or heating of urea or other reductant. Similarly, the PM reduction system may be controlled, for example, by controlling diesel fuel circulation, drainage, injection, active regeneration of the particulate filter, if so implemented.

In one embodiment, the exhaust after-treatment system may include one or more control modules (e.g., controllers), or sub-controllers/modules, communicating with ECU 12 for managing the various exhaust after-treatment components of the after-treatment system. For example, there may be a first control module configured to control the PM reduction system, while another control module may be configured to control the SCR system. In another example, such as where the exhaust after-treatment system is configured with a plurality of legs, each leg with its own set of SCR system components, the exhaust after-treatment system may include a single 'DPF' control module and multiple 'SCR' control modules (for example, three SCR control modules in a multi-leg after-treatment system configured with three legs, one SCR control module for each leg of the multi-leg system). However, such a multiple-control module system (herein, four-control module system) may be relatively cumbersome to manage. Thus, in an alternate embodiment, a single control module, configured with a larger number of input and output channels (I/O channels), can be used for both 'DPF' and 'SCR' applications. In such embodiments, the control module count may be substantially reduced, for example, to three or fewer control modules.

In another example, the exhaust after-treatment system may be coupled to at least an after-treatment control unit (ACU) dedicated to controlling and managing operation of the after-treatment system, while a fluid control unit (FCU) is dedicated to controlling and managing the reductant (e.g., DEF). Herein, the after-treatment control unit (ACU) may include various sensors and actuators for controlling the exhaust after-treatment system. The various sensors may include, for example, one or more temperature sensors to measure the exhaust temperature throughout the after-treatment system, one or more NOx sensors placed at the exit of the after-treatment system, and one or more pressure sensors to measure a pressure drop across components of the PM reduction system (such as the DOC and/or DPF) and across components of the SCR system (such as the SCR catalyst and/or the ASC). In one example, the ACU may also include a reductant injector control module to regulate injection (timing, amount, pressure, flow rate, duty cycle, etc.) of urea or other reductant into the SCR system.

The ACU may be configured to receive messages from the ECU and may be capable of relaying a message back to the ECU, as needed. In one example, the ACU may be self-contained such that if a fault is detected, the control module can respond with an appropriate action without requiring an input from the operator. In addition, the ACU may communicate with a switch box that is located in the operator cab, to allow manual shutdown of the system if desired. The switch box may control power to the ACU, injectors, and pumps. In one example, while the system is designed to be self-contained, the manual shutdown feature enables the operator to manually override and shutdown the system, if needed.

In an embodiment, the fluid control unit (FCU) system controls fluid delivery to the exhaust after-treatment system. The FCU system may include, for example, one or more pumps to deliver the reductant (e.g., urea) to the injectors and to circulate excess reductant back into the tank. Further, the FCU system may include one or more sensors to measure the level of reductant in the tank as well as the temperature of reductant in the tank. In one example, based on the temperature of the reductant in the tank, one or more heaters may be operated to maintain the reductant at an optimum temperature and prevent freezing.

In one embodiment, one or more power supplies are provided. In one example, a total of three power supplies are provided. For example, a first power supply can be used in conjunction with the ACU and adjoining components, while the second and third power supplies are used to provide power to the FCU system.

In one embodiment, the after-treatment control system is configured to meet the emission targets at 65% NOx reduction, 85% PM reduction, 85% CO reduction, and 85% HC reduction. The control system may be further configured to meet US CFR 40.201 and 49.210 locomotive noise level requirements.

Figure 2:
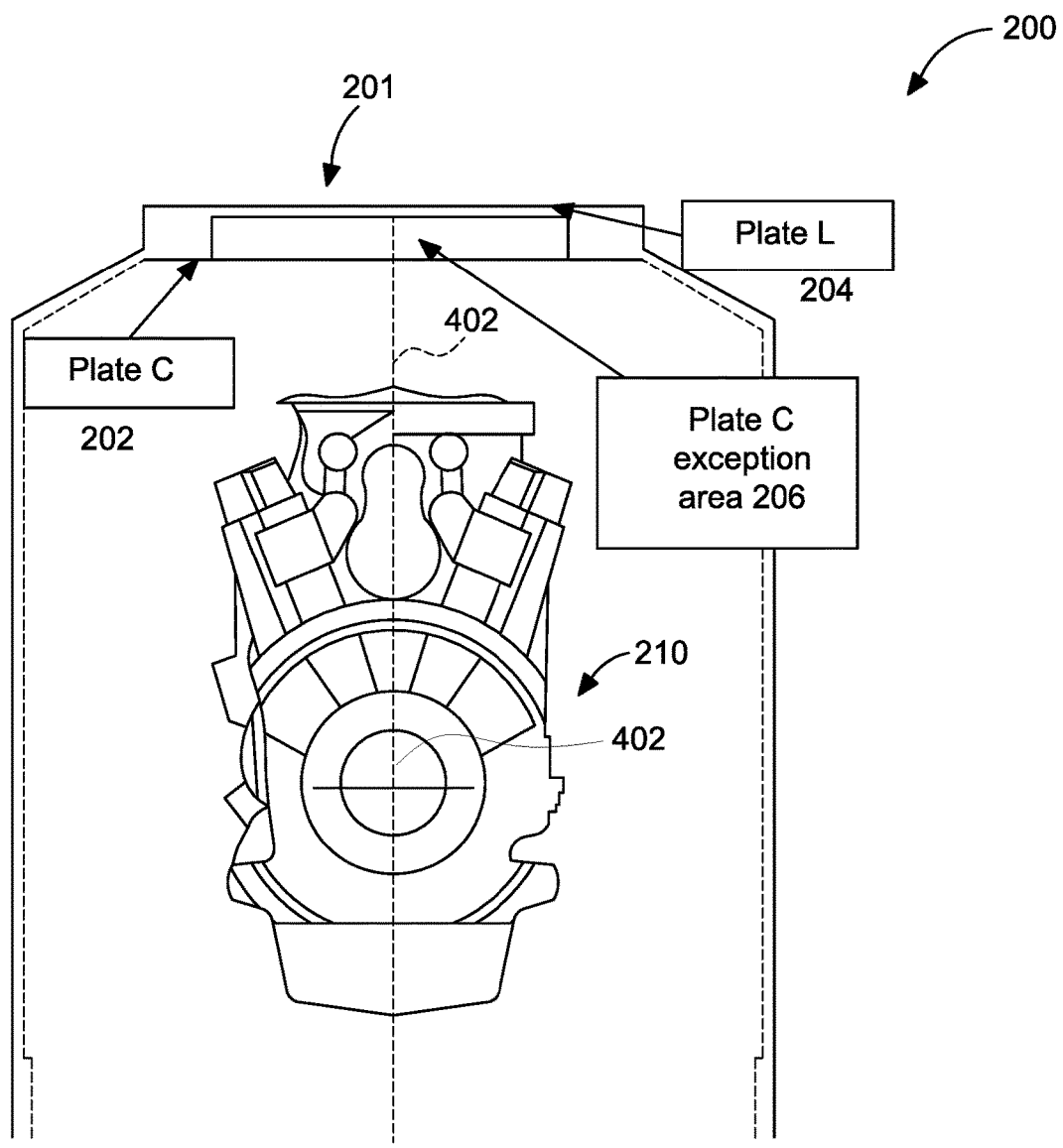
FIG. 2 shows clearance diagrams from commonly used North American locomotive applications.

The emissions control system 100 of FIG. 1 may be used, for example, in a rail embodiment such as a locomotive. Therein, the design of the exhaust after-treatment system may be adjusted based on the amount of clearance, or area/volume, available, around the locomotive engine within a locomotive engine cab. Turning to FIG. 2, map 200 shows various clearance diagrams, with relation to engine 210 positioned within engine cab 201 for commonly used North American locomotive applications. Specifically, map 200 shows a first clearance diagram 202 for a "Plate C with exception area" configuration (dashed line) ("Plate C") and a second clearance diagram 204 for a "Plate L" configuration (solid line) ("Plate L"). As such, Plate L is the larger of the two plates and is applicable on locomotives operated in most of the US and Canada. The slightly smaller Plate C is used for selected corridors in the northeastern US where some tunnels are slightly smaller. As indicated, Plate C has an exception area 206 which accounts, at least in part, for it being more restrictive. Most locomotives used in North American operations are built to fall within the first clearance diagram of the more restrictive Plate C, while fewer locomotives are built to fall within the second clearance diagram of the less restrictive Plate L.

Figure 4:
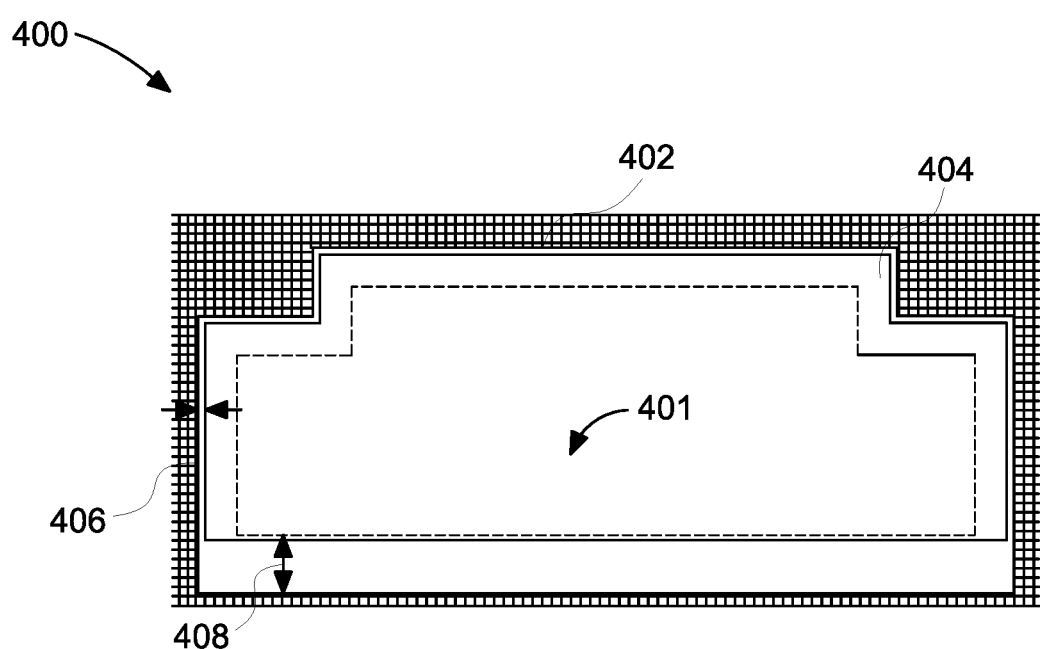
FIG. 4 shows a longitudinal view of the available packing volume/envelop.
Figure 5:
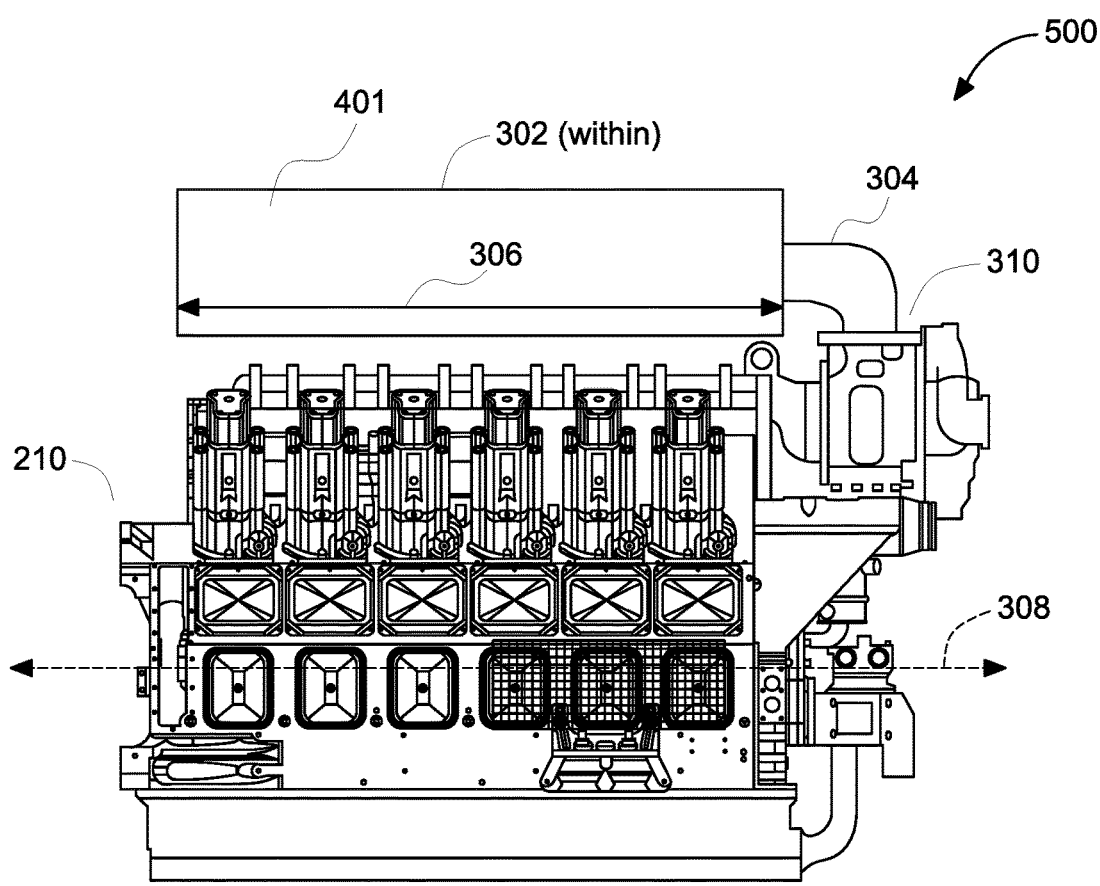
FIG. 5 shows a lateral view of the available packing volume/envelop.

The exhaust after-treatment system of the present disclosure has been designed to include all the components required to address exhaust emissions while taking into account the packaging volume available for a given plate configuration. As shown in FIGS. 3-5, packaging volume 401 is defined as the space available above engine 210 and within the chosen clearance diagram (herein, depicted for Plate C) while maintaining space for remaining cab structures (including current cab width and length), clearance, and any other necessary structures. FIG. 4 shows a longitudinal view 400 of the packaging volume 401 available for a Plate C 402 configured locomotive. Height requirements for mounting structure 408 coupled with manufacturing tolerances, further constrained by original packaging volume, challenge the incorporation of all the components of the exhaust after-treatment system within the Plate C clearance diagram. Necessary clearances and structures include an external clearance 406 (for example, 1"/~2.5 cm long), a cab structure 404 (for example, 3"/~7.5 cm long), and a mounting structure 408 (for example, 5.5"/~14 cm long).

FIGS. 3 and 5 show alternate views (300 and 500, respectively) of the packaging volume 401, or envelope, available within which exhaust after-treatment system 302 is designed to fit. Specifically, the exhaust after-treatment system of the present disclosure is designed to fit within packaging volume 401 when mounted over the exhaust manifold of engine 210. Exhaust after-treatment system 302 is designed to include a plurality of in-line exhaust flow passages, or legs 304, though which at least a portion of the exhaust stream can flow. The exhaust after-treatment system is mounted on engine 210 via a mounting structure (not shown) such that a longitudinal axis 306 of the after-treatment system is aligned in parallel (or generally parallel) to a longitudinal axis 308 of engine 210. In the embodiment where the engine is a locomotive engine housed in an engine cab, the engine may be positioned within the cab such that the longitudinal axis of the after-treatment system is aligned in parallel (or generally parallel) to the longitudinal axes of both the engine and the engine cab.

In the depicted embodiment, exhaust after-treatment system 302 is shown as a multi-leg system with three legs 304, wherein each leg 304 represents a single in-line flow passage of exhaust after-treatment components. Specifically, each leg 304 of the multi-leg exhaust after-treatment system 302 enclosed within packaging volume 401 has a complete set of all the exhaust after-treatment components, including all components of the SCR system and the PM reduction system.

The plurality of exhaust passages, or legs, 304 of the exhaust after-treatment system 302 are configured to receive at least a portion of the exhaust stream from an exhaust outlet of engine 210 via a transition section 310. To achieve this function, transition section 310 turns the exhaust flowing from the single turbocharger outlet into the three inputs of the after-treatment system legs 304. As such, this turning has to be accomplished in a very short flow length and with a sharp turn radius, with a minimum loss of exhaust pressure. At the same time, it is desired to provide an even flow distribution into all three legs so as to increase emissions control system performance. Thus, in one embodiment, as depicted in FIG. 11, transition section 310 is configured with one or more appropriately designed restrictions. Specifically, transition section 310 is outfitted with a restriction plate 1102 that includes a restricting orifice for a middle leg of the exhaust after-treatment system. That is, by way of the plate 1102, a flow aperture 1104 between the transition section 310 and the middle leg is narrower than flow apertures 1106 between the transition section and other legs. Depending on the internal configuration of the transition section 310, each of the openings (between the transition section and legs) may be different sized, or they may be the same size, or some may be the same size and others different. Restriction(s) may be appropriately designed, to increase flow uniformity, through empirical testing, flow modeling, etc. based on the internal shape/configuration of the transition section, the flow output range of the engine exhaust, and the configuration(s) of the exhaust passages/legs. Restriction plates may be fitted from outside to further control the flow through the legs.

In one embodiment, shown in FIG. 9A, the plurality of exhaust flow passages 904 include a first, a second, and a third exhaust passage with the second exhaust flow passage (or middle leg) nested between the first and third exhaust flow passages (or outer legs). Considering that the middle region of the exhaust outlet passage (through the transition section 310) may tend to receive the bulk of the exhaust flow, using a restriction plate 1102 for the middle leg (that restricts flow from the middle region of the engine exhaust outlet to the middle leg of the exhaust after-treatment system) may facilitate better exhaust distribution between the middle and outer legs of the exhaust after-treatment system. In this way, by including one or more restrictions, the restricted transition section may provide improved flow distribution with minimum pressure loss at an acceptable combination of cost, performance, and structural strength. In an embodiment, the transition section 310 provides a flow uniformity variation of <1%.

As shown in FIGS. 3 and 5, designing the exhaust after-treatment system as a multi-leg (herein, depicted with three legs) control system design also enables a smaller profile volume for the exhaust after-treatment system. The lower profile after-treatment system also has a reduced catalyst volume. The reduced volume allows the Plate C clearance diagram to be maintained, and maximizes the potential application of the exhaust after-treatment system as a retrofit product. Furthermore, maintaining current control system design and packaging volumes may allow for reuse of Plate C to Plate L clearance diagrams, if desired.

Figure 6A:
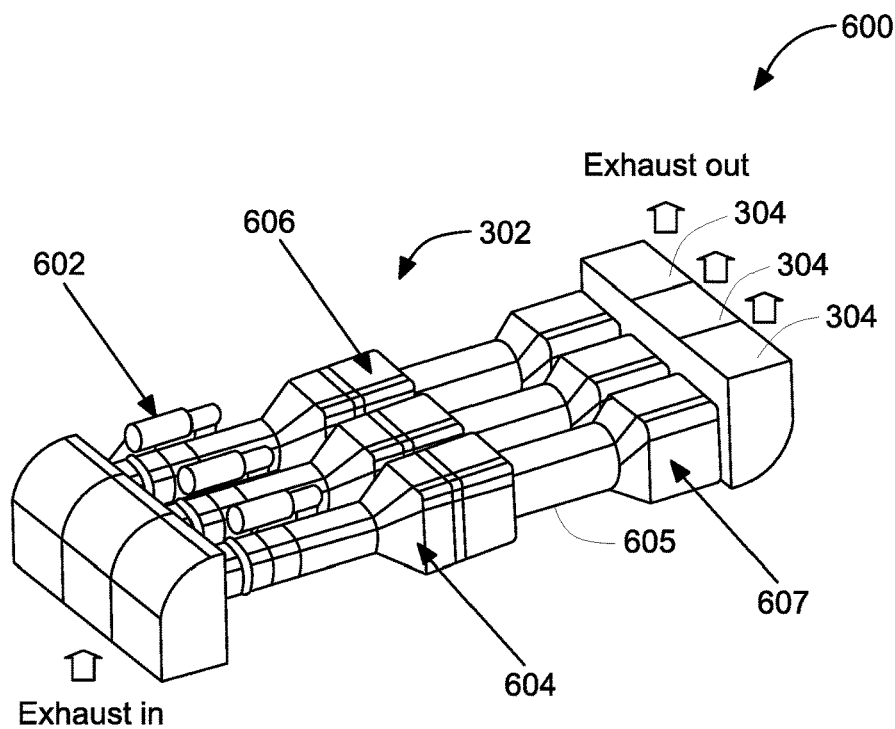
FIG. 6A shows an example embodiment of the after-treatment system of FIG. 3 with a burner.
Figure 6B:
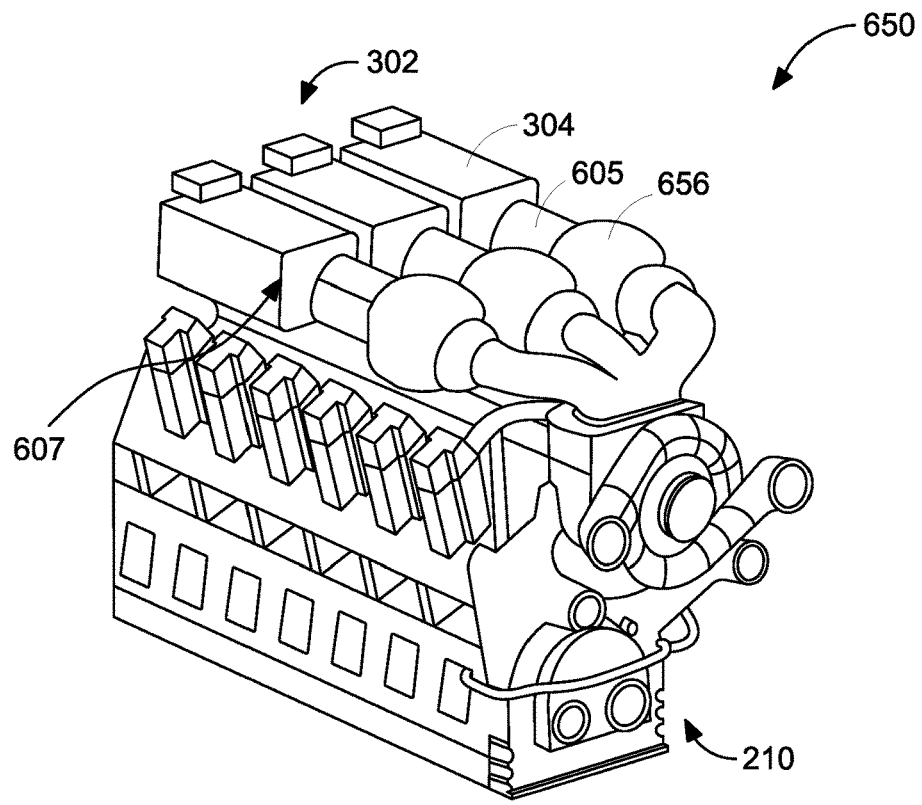
FIG. 6B shows an example embodiment of the after-treatment system of FIG. 3 without a burner.

As shown in FIG. 1, the exhaust after treatment system may include a PM reduction system 103 with several exhaust after-treatment components, such as a diesel particular filter (DPF) 106. As such, various configurations may be possible for DPF 106 in the exhaust after-treatment system. For example, one or more wall-flow diesel particulate filters with one or more associated burners or heaters can be used. Alternatively, one or more flow-through diesel particulate filters can be used. FIG. 6A depicts a first embodiment 600 wherein each leg 304 of multi-leg after-treatment system 302 includes a PM reduction system configured with a wall-flow diesel particulate filter 606 and an associated regeneration system including a burner or heater 602, upstream (in the direction of exhaust flow) from the diesel oxidation catalyst 604 and SCR system 607. FIG. 6B depicts a second embodiment 650 wherein each leg 304 of exhaust after-treatment system 302 is configured with a flow-through diesel particulate filter 656 coupled to the diesel oxygen catalysts. In this embodiment, an associated burner is not required, thereby allowing relatively more working volume to be available. Additionally, in such an embodiment, the likelihood of road failures of the locomotive, such as due to burner problems or clogging of the particulate filter, are reduced. Further still, NOx reduction and particulate matter (PM) reduction is improved with the use of the coupled diesel oxygen catalyst and flow-through filter (FTF) approach in the PM reduction system.

Each of the plurality of exhaust flow passages, or legs, is defined by a distinct substrate 605 (or set of substrates) through which the exhaust stream can flow. The substrate material used can include, for example, metallic or ceramic bases. Embodiments using metallic bases tend to be more robust, and are available in more complex configurations. In comparison, embodiments using ceramic bases tend to be more chemically and thermally stabile and have relatively lower substrate corrosion in the presence of high-temperature exhaust and ammonia.

The shapes of substrate 605 may also be varied. In one example, as illustrated in embodiment 700 of FIG. 7A, the substrate 605 of each leg 304 of exhaust after-treatment system 302 is rectangular shaped. In another example, as illustrated in embodiment 750 of FIG. 7B, the substrate 605 of each leg 304 of exhaust after-treatment system 302 is cylindrically shaped. The cylindrical substrates depicted in FIG. 7B may be structurally stronger than other shapes made of extruded ceramic substrates. Thus, given the harsh noise, high impact, and vibrations experienced in the locomotive environment, cylindrical forms may be advantageously used in rail embodiments. In alternate, less harsh applications, rectangular or cube shaped substrate systems may be used.

Use of cylindrically shaped substrates may also enable a further reduction in catalyst volumes compared to other possible shapes. Specifically, as shown in FIG. 7B, each leg of the multi-leg exhaust after-treatment system can be further divided into a plurality of sub-legs (herein, shown as three sub-legs), which may be nested for further compaction. Thus, in the short flow lengths available in the after-treatment system of the rail embodiment, flow distribution may be improved by using cylindrically shaped substrates, thereby also improving engine and locomotive performance.

FIG. 7B depicts a first example embodiment wherein each of the plurality (herein three) of cylindrically-shaped exhaust flow passages, or legs 304, is further divided into a plurality (herein three) of distinct, cylindrically-shaped exhaust flow sub-passages 704. The exhaust flow sub-passages 704 for each leg 34 are arranged with at least some sub-passages on an upper level 706 immediately above at least some other sub-passages on a lower level 708. That is, for a given exhaust flow passage (or leg), a first number of sub-passages are on top of a second number of sub-passages. This configuration enables a further compaction upon nesting of neighboring exhaust flow passages, thereby providing packaging advantages. For example, a first exhaust flow passage 754 may be configured with a smaller number (herein one) of sub-passages 704 on the upper level 706 and a larger number (herein two) of sub-passages 704 on the lower level 708. A second exhaust passage 756 may be configured with a larger number (herein two) of sub-passages 704 on the upper level 706 and a smaller number (herein one) of sub-passages 704 on the lower level 708. A third exhaust flow passage 758 may also be configured with a smaller number (herein one) of sub-passages 704 on the upper level 706 and a larger number (herein two) of sub-passages 704 on the lower level 708. The first, second, and third exhaust passages are then aligned such that the second exhaust flow passage 756 (herein also referred to as middle leg) is nested between the first and third exhaust flow passages 754, 758 (herein also referred to as outer legs). In other words, the cylindrical shape of the substrates allows the sub-passages of the middle leg to be inverted (along a top to bottom axis) with respect to the sub-passages of each of the neighboring outer legs 754, 758. This configuration provides for desirable space utilization, while the commonality of parts provided by this configuration reduces manufacturing and component costs.

To further enable substantially uniform flow distribution through the exhaust flow passages of FIG. 7B, a region of the transition section (310, FIG. 11) coupled to the second exhaust flow passage 756 (or middle leg) may be configured with more restrictions (1102, FIG. 11) than the region of the transition section coupled to the first and third exhaust flow passages (or outer legs).

Figure 7A:
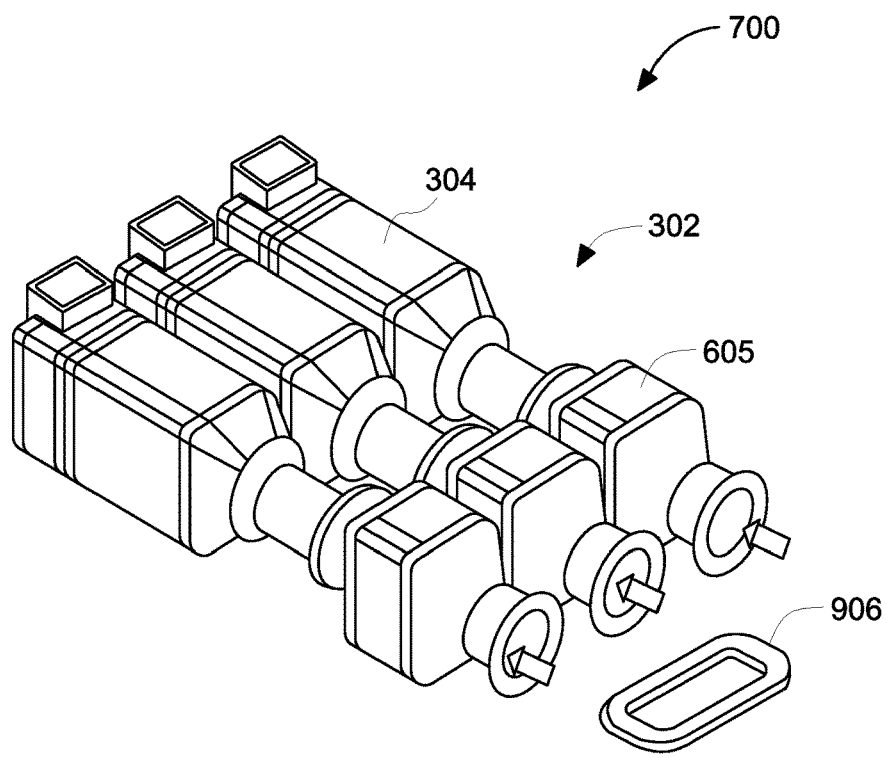
FIG. 7A shows an example embodiment of the exhaust after-treatment system of FIG. 3 configured with a rectangular substrate system.
Figure 7B:
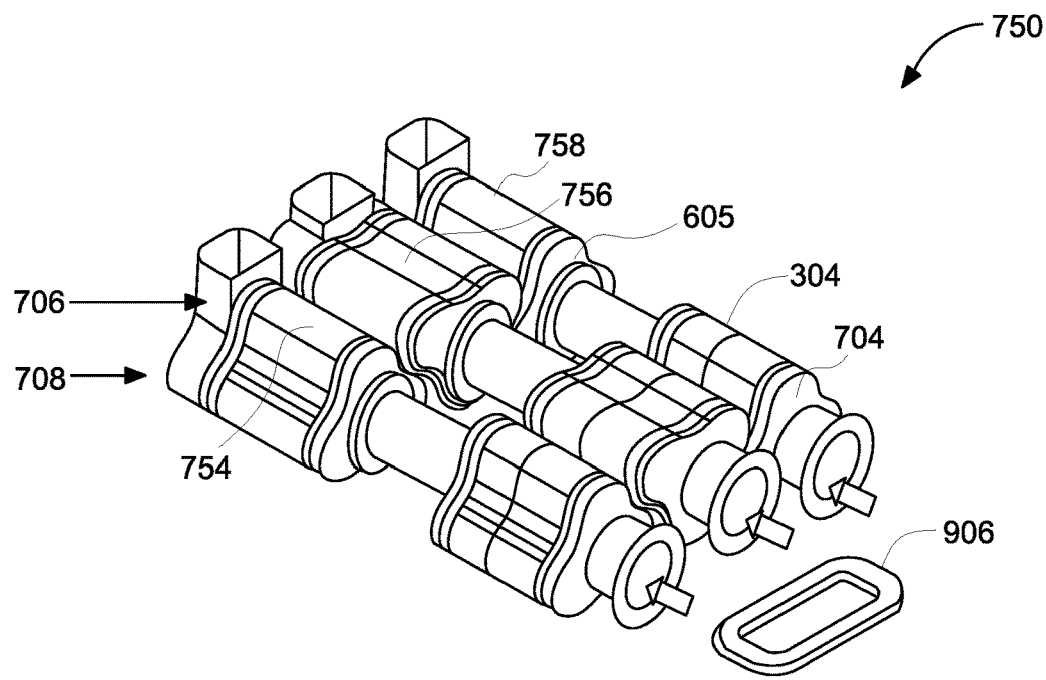
FIG. 7B shows an example embodiment of the exhaust after-treatment system of FIG. 3 configured with a cylindrical substrate system.
Figure 8:
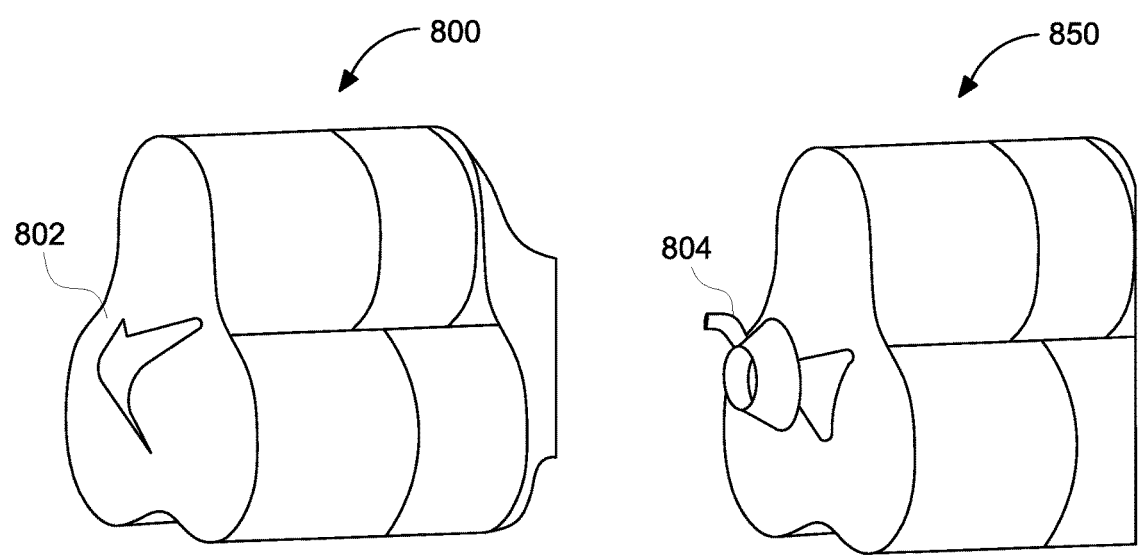
FIG. 8 shows example embodiments of flow diverters that may be used in the emissions control system of FIG. 3.

Optionally, one or more flow diverter systems may be employed with the substrate systems of FIGS. 7A-B, for diverting flow through the plurality of exhaust flow passages of the exhaust after-treatment system. FIG. 8 shows a first example embodiment of a flow diverter 800 that comprises a first flow diverter configuration 802. FIG. 8 also shows a second example embodiment of a flow diverter 850 that comprises a second flow diverter configuration 804. In the case that the naturally-occurring flow distribution is not sufficiently distributed across the faces of the catalyst substrates, additional flow diverters/baffles can be employed to spread the exhaust.

In the case of a rail embodiment of the emissions control system of the present disclosure, the mounting of a large and heavy exhaust after-treatment system onto a locomotive engine involves addressing space restrictions and material capabilities. For example, the heavy weight and large size of the exhaust after-treatment system does not allow for the use of relatively simple elastic hangers or clamp rings that might otherwise be acceptable for use in automotive applications. Additionally, a mounting structure used for the exhaust after-treatment system has to account for longitudinal expansion given the significant thermal expansion experienced by exhaust after-treatment system components. The mounting structure should also be able to withstand relatively high longitudinal shock loads that may be experienced during locomotive coupling. At the same time, the mounting structure should have low impact on the maintainability of the engine while being easy to install and remove from the locomotive.

Various selection criteria may be used to address various application specific design concerns. For example, where the after-treatment system is mounted on the locomotive engine or locomotive cab platform, these selection criteria may include buff load capability of the engine and/or platform, effect of mechanical vibrations on the after-treatment system and related mounting structures (and sub-structures), impact of mechanical vibrations on the reliability of other components in the vehicle (such as, other locomotive components), effect on maintainability (such as, for routine maintenance operations) due to engine and/or platform mounting, ease of modification and restoration of the locomotive, costs, emissions performance, etc. For example, an engine-mounted after-treatment system may be used on locomotives if the specific application has less-significant on-engine vibration signatures and the buff/coupling loads of the locomotive are more significant, while a platform-mounted emissions control system may be used on locomotives if engine vibrations are very substantial, but buff/coupling loads are less severe or less frequent. Thus, based on the selected criteria, the mounting of the after-treatment system (e.g., position, location, height, structures used for mounting) may be varied. In one example, based on the above-mentioned criteria, a locomotive may be fitted with an engine-mountable exhaust after-treatment system, as shown in FIG. 9A. In another example, based on the above-mentioned criteria, a locomotive may be fitted with a platform-mounted after-treatment system, as elaborated upon in FIG. 10.

One example of an engine-mountable after-treatment system 900 is depicted in FIG. 9A. The engine-mountable after-treatment system is designed to provide the desired stability and strength. In the depicted embodiment, exhaust after-treatment system 902 includes a plurality of distinct exhaust flow passages 904, wherein each of the plurality of distinct exhaust flow passages 904 is configured to receive at least some exhaust gas from an exhaust manifold (also referred to as the exhaust outlet) 906 of engine 210. (In FIG. 9A, for simplicity of illustration, the distinct exhaust flow passages 904 are not shown connected to the exhaust manifold 906; however, when the system 900 is deployed for operation, the distinct exhaust flow passages 904 would be connected to the exhaust manifold 906 by way of a transition section, such as section 310 shown in FIG. 3.) Engine 210, herein, is a locomotive engine configured to be positioned in an engine cab (FIG. 12) of the locomotive. The exhaust after-treatment system is mounted on engine 210 such that a longitudinal axis 306 of the after-treatment system 902 is aligned in parallel (or generally parallel) to the longitudinal axis 308 of engine 210. The plurality of distinct exhaust passages 904 are aligned in parallel (or generally parallel) to each other and in parallel (or generally parallel) to the longitudinal axis 306 of the after-treatment system 902.

Exhaust after-treatment system 902 is mounted on engine 210 via an engine-mounted support structure 910. Engine-mounted support structure 910 includes a base 912 and a plurality of mounting legs 914. One end 916 of each mounting leg 914 is coupled to a lower surface of the base 912, while another, opposite end 918 of each mounting leg 914 is coupled to the engine 210 at one of a plurality (e.g., four) of mounting locations 920. The plurality of mounting locations 920 includes at least some locations on an engine frame 922 of engine 210, and at least some locations on a front end 924 (e.g., front end cover) of engine 210. The base 912 may include cross-members, attached to and extending between the peripheral edge member(s) of the base, for enhanced rigidity. The base 912 may be substantially rectangular (although other shapes are possible), and the plurality of mounting legs 914 may be of substantially equal height, although this will depend on the mounting locations (that is, if one of the mounting locations is lower than the others, with respect to a distance from the desired position of the base, then the leg for attachment to the lower mounting location will be longer than the others).

The exhaust after-treatment system 902 may be mounted to the engine-mounted support structure 910 in several ways. For example, the support structure 910 may include a plurality of vibration isolators 915 to which the after-treatment system 902 is mounted, for providing vibration and shock load isolation for each leg of the exhaust after-treatment system (and thereby improving system stability). FIG. 9B shows one example of a possible configuration, according to an embodiment of the invention. Here, the engine-mounted support structure 910 further includes a plurality of support members 926. The support members 926 are welded or otherwise attached to the top of the base 912, and provide support and attachment points for a plurality of isolators 915, shown schematically in this view. There may be one support member 926 for each isolator 915 (as generally shown in FIG. 9B), or the support members 926 may be strip-like plates that extend across opposite parallel sides of the base 912 for supporting two or more isolators (as indicated by lines 917). The isolators 915 are bolted or otherwise attached to the support members 926. In turn, mounting brackets 919 of the after-treatment system 902 are bolted or otherwise attached to the isolators 915. The mounting brackets 919 hold the after-treatment system 902 above the support structure 910, and act as attachment points of the after-treatment system 902 to the isolators 915 or otherwise to the support structure 910. (The mounting brackets 919, or similar structures, are not shown in FIG. 9A, for the sake of simplicity of illustration.) In an embodiment, with reference to FIG. 9C, each distinct leg 904 of the after-treatment system 902 includes plural (e.g., four) mounting brackets 919, which are spaced apart along the length of the leg 904, and is attached to the base 912 by a corresponding number (e.g., four) of isolators 915. Thus, in the depicted three-leg exhaust after-treatment system 902, the system 902 is attached to the support structure 910 at twelve supporting points 928, which provide vibration and shock load isolation for the exhaust after-treatment system.

To address thermal expansion of the after-treatment system, a combination of first and second, different types of isolators may be used, for example, a combination of relatively stiff isolators and relatively soft isolators. Alternatively and/or additionally, the isolators are metallic isolators (meaning the isolators include a metal element that performs a vibration/isolation function). In one embodiment, all the isolators are metallic isolators. The various metallic isolators can include a plurality of relatively stiff metallic isolators 915a, for example, wire mesh isolators, used at the points where the legs 904 are attached at the engine front end 924. In one example, for a system with three legs 904, three such relatively stiff metallic isolators 915a are present in the mounting structure (e.g., one such isolator for each leg). The various metallic isolators may further include a plurality of relatively soft metallic isolators 915b, for example, cable-mounted isolators (also known as cable isolators), used at all other locations of the mounting structure. (The isolators are generally referred to by element number 915; specific types of isolators by 915a, 915b, etc.) In one example, for a system with three legs 904, nine such relatively soft metallic isolators 915b are present in the mounting structure. In such a configuration, the wire mesh isolators handle buff load (e.g., longitudinal force), while the cable-mounted isolators handle the thermal expansion of the exhaust after-treatment system. In this way, both types of isolators work in parallel to isolate the after-treatment system from the effects of engine vibrations.

An example of a platform mounted emissions control system 1000 is depicted in FIG. 10. In this embodiment, the exhaust after-treatment system 1002 is mounted above the locomotive engine 210 via a platform-mounted support structure 1004. The support structure 1004 includes a substantially rectangular base 1006 coupled to a locomotive platform 1008 via a plurality of vertical posts 1010 of substantially equal length. (For example, in an embodiment, the base is level.) The plurality of vertical posts 1010 are further coupled to each other via a plurality of angled stiffening bars 1012. As a non-limiting example, the design depicted in FIG. 10 utilizes three vertical posts 1010 on each side of the locomotive. Isolation from shock and vibration is addressed through vertical posts 1010, as well as through a plurality of vibration isolation support points 1014 (e.g., isolators, as explained elsewhere herein), though the inputs to the different posts and support points may vary in magnitude and frequency based on their position. In one example, the plurality of vertical posts 1010 are evenly distributed along the length of the locomotive cab (as shown), although in alternate embodiments, based on the configuration of the locomotive cab, a larger number of vertical posts 1010 may be provided at one end of the support structure as compared to the other end of the support structure 1004. The vibration isolation support points 1014 may be positioned at various locations based on where in the engine 210, or engine cab, vibrations are most likely to be experienced, and further based on an amount of vibration expected. For example, at least some vibration isolation points 1014 may be positioned between an upper surface of the base 1006 and the substrate of each leg of the exhaust after-treatment system 1002. Additional vibration isolation points 1014 may be positioned between a lower end of each vertical post 1010 and the platform 1008. In this way, the depicted platform-mounted exhaust after-treatment system accounts for the moments involved with the large size and heavy mass of the after-treatment system mounted on the tall structure of the locomotive.

In an embodiment, an emissions control system includes a support structure and an exhaust after-treatment system. The support structure is at least partially positioned above an engine. (The engine is capable of producing an exhaust stream.) The exhaust after-treatment system has at least one exhaust after-treatment unit through which at least a portion of the exhaust stream is directed to flow. Each exhaust after-treatment unit has at least one exhaust after-treatment component for treating the portion of the exhaust stream flowing through the unit. The at least one exhaust after-treatment unit is attached to the support structure and positioned above the engine. Additionally, the engine is supported on a platform, and the support structure is attached to the platform.

In an embodiment, an emissions control system includes a support structure and an exhaust after-treatment system. The support structure is at least partially positioned above an engine. (The engine is capable of producing an exhaust stream.) The exhaust after-treatment system has at least one exhaust after-treatment unit through which at least a portion of the exhaust stream is directed to flow. Each exhaust after-treatment unit has at least one exhaust after-treatment component for treating the portion of the exhaust stream flowing through the unit. The at least one exhaust after-treatment unit is attached to the support structure and positioned above the engine. The engine is housed in an engine cab. The at least one exhaust after-treatment unit is attached to the support structure and positioned above the engine such that a longitudinal axis of the at least one exhaust after-treatment unit is at least generally parallel to a longitudinal axis of the engine and a length of the engine cab.

In some rail embodiments, due to the complex shape and size of the exhaust after-treatment system, as it extends above the original engine cab, the design of the engine cab is also modified to better protect and support the mounted exhaust after-treatment system. It will be appreciated that the engine cab design for a given locomotive may be selected based on a variety of criteria such as accessibility to engine cab components, and ease of manufacturing. Various example engine cab designs are now discussed with reference to FIGS. 12-15.

Figure 12:
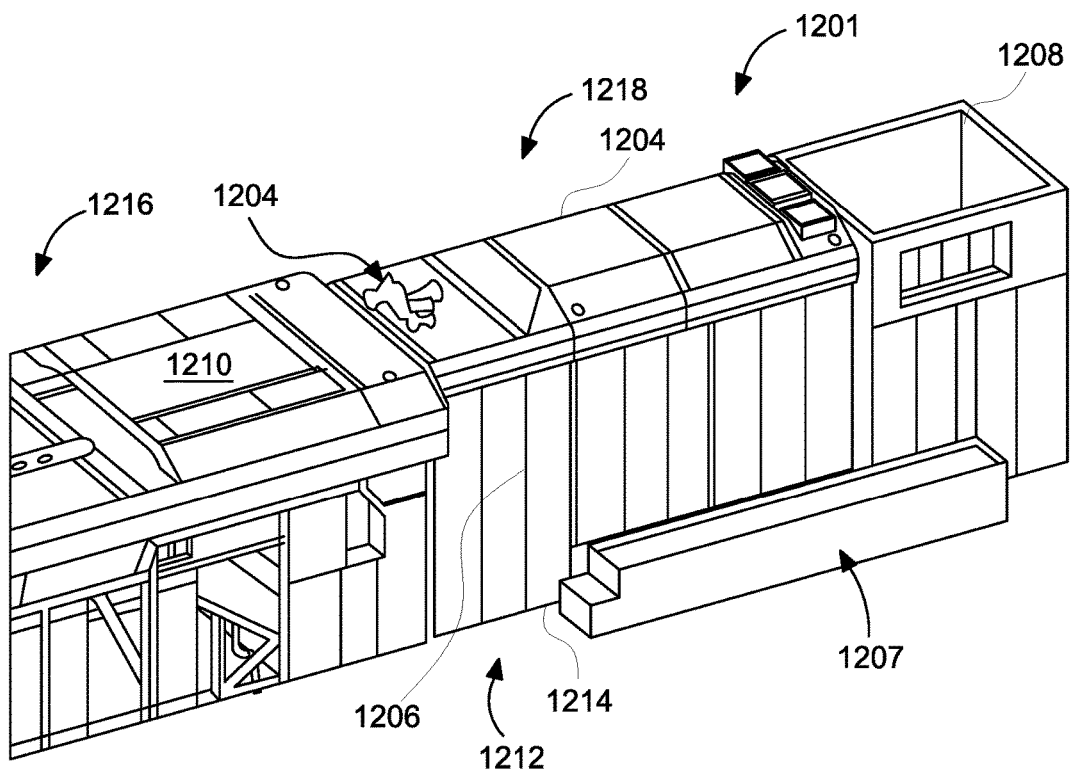

A first example embodiment of an engine cab 1202 of locomotive 1201 housing a locomotive engine and an exhaust after-treatment system is depicted in FIG. 12. Engine cab 1202 is defined by a roof assembly 1204 and side walls 1206. Engine cab 1202 is shown with several interfaces for communicating with other cabs and components of locomotive 1201. Engine cab 1202 is configured to protect an enclosed exhaust after-treatment system (not shown), an engine housed within the cab, and auxiliaries from rain, snow, dust, wind, sun, and inclement weather conditions. Engine cab 1202 is also configured to support a horn system 1204, lighting (if present), and power outlets. The design of engine cab 1202 enables operating personnel to be protected from hot surfaces and rotating parts while also enabling the cab to support maintenance personnel on the roof.

The horn system 1204 may include one or more horns positioned above the engine within locomotive engine cab 1202, at a front end 1216 (herein also referred to as #2 end) of the engine cab 1202 between the after-treatment system and a front wall (not shown) of the cab, an open end of at least one horn facing towards the center 1218 of the engine cab 1202.

In the depicted embodiment, engine cab 1202 is designed with a complete uniformity of appearance, and with a locomotive exterior. Additionally, multiple interfaces are provided. These may include, for example, an interface communicating with a urea tank 1207, an interface communicating with blower cab 1208, an interface interacting with radiator cab 1210, and an interface for a rail platform (not shown). The engine cab 1202 and the several interfaces are designed so as to provide sufficient clearance to allow for significant thermal variations in the exhaust after-treatment system while having minimal impact on the maintainability of the after-treatment system and the engine. In one example, this is achieved by positioning the interface between the engine cab 1202 and urea tank 1207 on the A side walkway 1212, while the urea tank 1207 is bolted to the platform 1214 of the locomotive.

Figure 13:
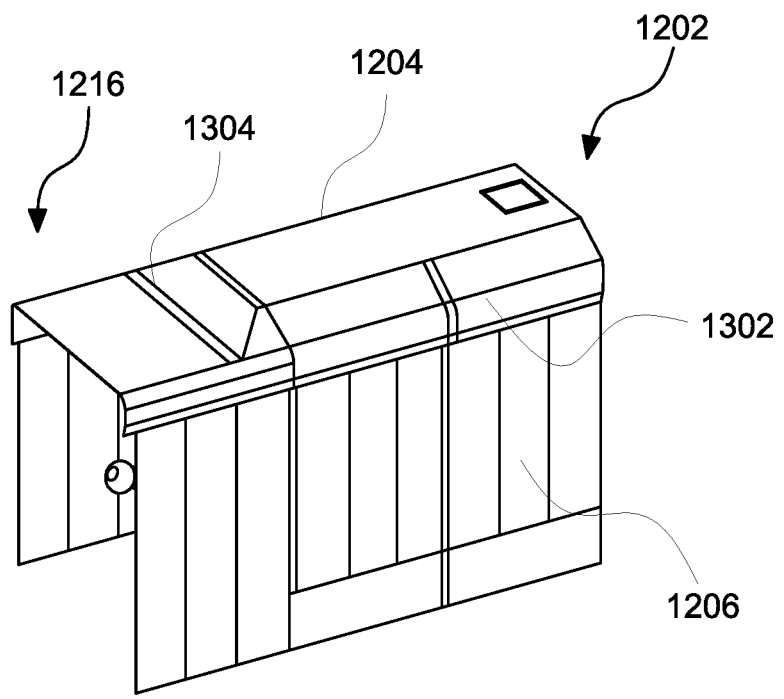

FIG. 13 shows an alternate view of the engine cab 1202 of FIG. 12. As shown, roof assembly 1204 of engine cab 1202 includes a plurality of roof panels 1302 hingedly-attached to a side wall 1206 of the cab such that the exhaust after-treatment system is accessible through at least one of the plurality of hingedly-attached roof panels 1302. In the depicted embodiment, the hingedly-attached roof panel 1304 at the front end 1306 (herein also referred to as the #2 end) is a separable assembly and can be a bolt-on type hatch arrangement just above the turbocharger (not shown). The engine cab 1202 is designed to accommodate a horn system (such as horn system 1204 of FIG. 12). A hinged hatch assembly is also included which can be opened to 90 degrees to facilitate maintenance of the exhaust after-treatment system and/or its components.

Figure 14:
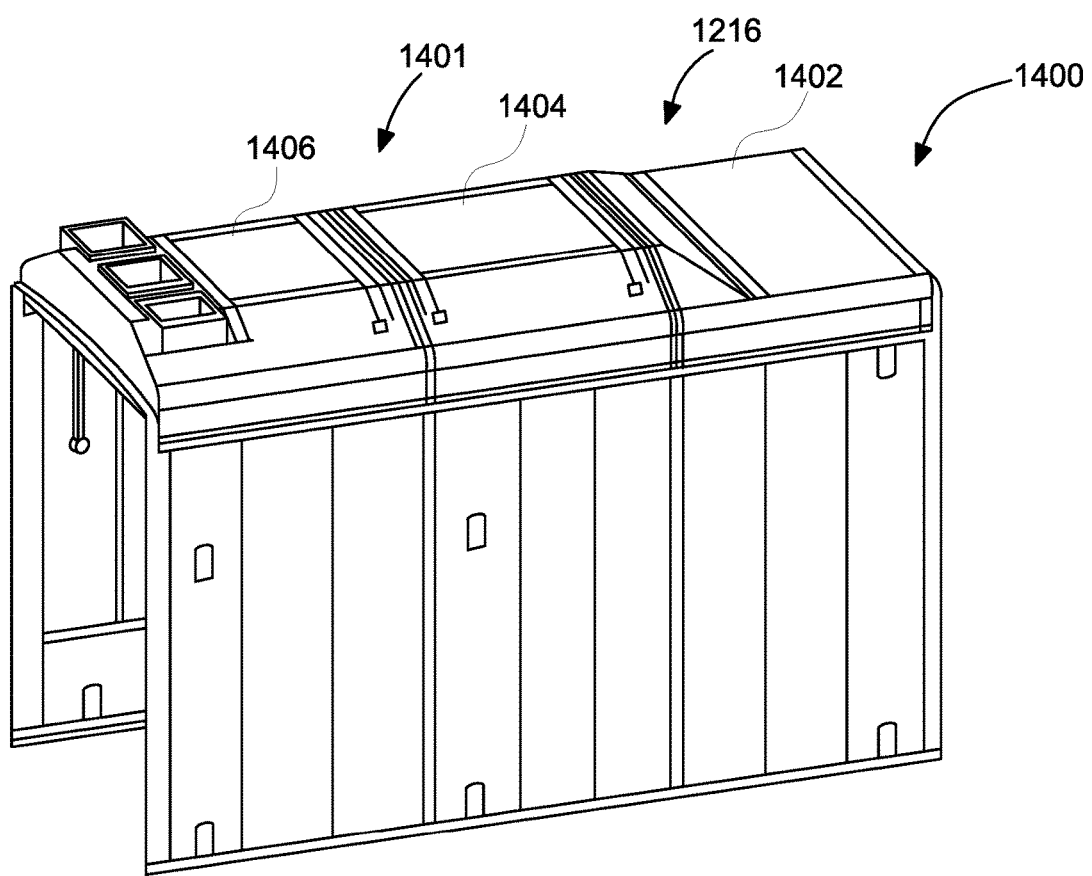

FIG. 14 shows an alternate embodiment of an engine cab 1400 wherein the roof assembly 1401, at the front end 1216 of the engine cab, is split into a plurality (herein three) of hingedly-attached roof panels 1402, 1404, and 1406 of substantially equal dimensions. However, in alternate embodiments, the dimensions of the different panels may be different. In the depicted embodiment, no hinges or latches are provided. Instead, the different roof panels are bolted to the sidewalls. Herein, roof panels 1402, 1404, 1406 cover the entire width of the engine cab, thus providing more accessibility to the exhaust after-treatment system and its components.

Figure 15:
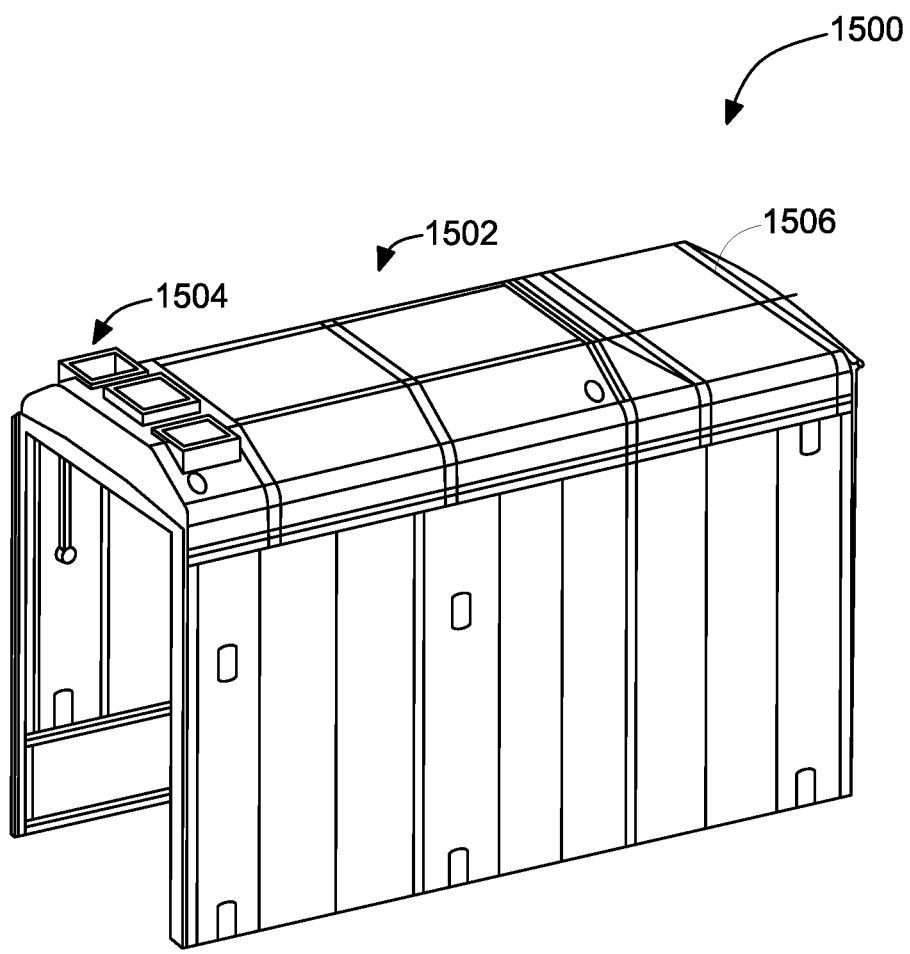

FIG. 15 shows another example embodiment of an engine cab 1500 wherein the plurality of roof panels of roof assembly 1502 includes a first larger panel 1504 and a second smaller panel 1506. Herein, roof panels 1504 and 1506 both are bolt-on roof panels, or hatch assemblies. Specifically, the first larger roof panel 1504 is designed as a larger bolt-on hatch assembly which covers the plurality of legs of the exhaust after-treatment system, while the second smaller roof panel 1506 is designed as a smaller bolt-on hatch assembly positioned above the turbocharger location, with the horn system mounted to it. This design allows for relatively good service access. Additionally, in the embodiment shown in FIG. 15, the hinged system allows access to the side legs of the exhaust after-treatment system while keeping the middle leg covered.

Packaging the horn system within the Plate L clearance profile while also finding a suitable location for the horn system above the engine cab roof can pose design challenges. Additionally, if any changes are made to the horn system, or its location, Federal Railroad Administration (FRA) regulations require the changes to be tested per FRA rules. FIGS. 16A-B show two different horn system configurations (1600 and 1650, respectively) that have been designed taking these challenges into account. As such, each horn system 1600, 1650 may include one or more horns positioned above the engine within locomotive engine cab 1606, at a front end 1604 of the engine cab 1606 between the after-treatment system and a front wall of the cab, an open end 1608 of at least one horn facing towards the center of the engine cab 1606. The first embodiment 1600 (FIG. 16A) depicts a single 5-chime horn 1601 while the second embodiment 1650 (FIG. 16B) depicts a split horn 1602 including two horns, a first horn with a 3-chime configuration 1610 and a second horn with a 2-chime configuration 1612.

As elaborated previously with reference to FIG. 1, the SCR system of the exhaust after-treatment system may use a reductant, e.g., diesel exhaust fluid (DEF; referring to a 32.5% solution of urea in water), for the reduction of exhaust NOx species. In the example embodiment of FIG. 1, in a urea-based (e.g., DEF) system, the urea tank for storing urea may be sized such that the frequency of refilling urea in the urea tank matches refueling of the locomotive engine fuel tank. The urea tank and delivery system may also be designed to allow for reasonable serviceability of the engine, alternator, and radiator cab with minimal modification/redesign of existing locomotive hardware.

With regard to the location of the urea (e.g., DEF) or other reductant storage tank, various configurations are contemplated that take into account the design constraints. These configurations include, for example, carving the urea tank out of the existing fuel tank for the engine, installing the urea tank on the locomotive walkway as a raised walkway, and installing the urea tank in the radiator cab.

Figure 17A:
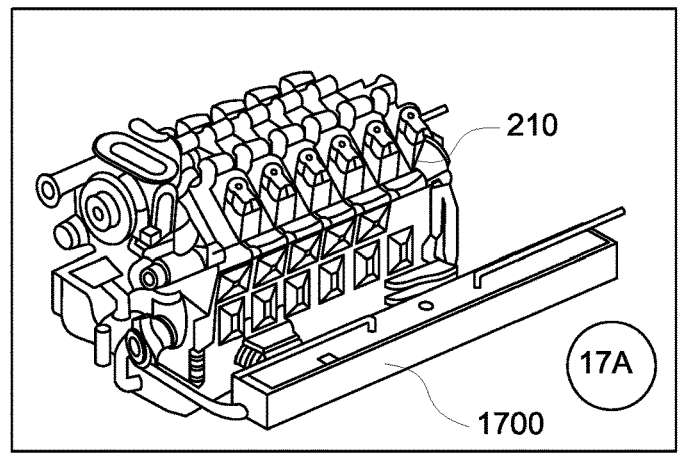
Figure 17B:
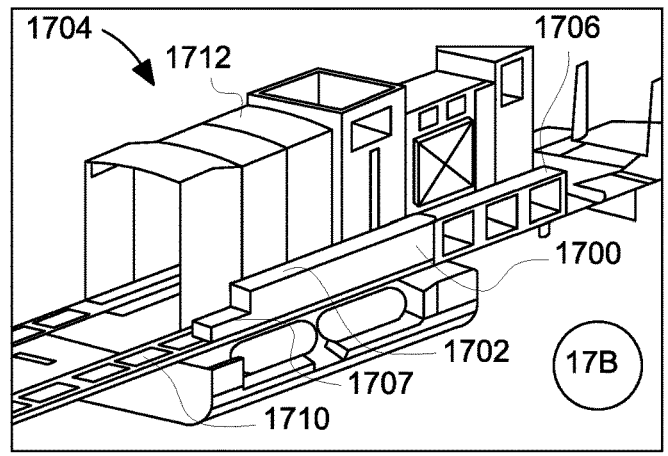

FIGS. 17A-17F show various embodiments where a urea (e.g., DEF) or other reductant storage tank 1700 is configured as a raised walkway 1702 on a locomotive or other vehicle 1704. These designs may reduce sloshing and dead-volume issues while maintaining an ergonomic step progression down a side of the locomotive or other vehicle. FIG. 17A shows a tank 1700 and engine 210 in isolation, for reference or comparison purposes. As indicated, the tank 1700 includes an inlet for receiving DEF or other urea (or other reductant), and is connected to the engine system (e.g., an emissions system portion of the engine system) for delivering DEF or other urea. FIG. 17B is a perspective view of a first embodiment of a tank 1700 configured as a raised walkway 1702. The tank 1700 extends from a battery box or other vehicle structure portion 1706 on one side of the vehicle (e.g., the "A" side of a locomotive), and steps down to a lower deck 1710 along an operator cab, engine cab, or other cab 1712 of the vehicle. (In any of the embodiments, the lower deck 1710 may be the lowest walkway, with respect to a ground level, along the side of the vehicle, and/or the lower deck 1710 is a deck located at a standard deck height of the vehicle or class of vehicles in question; see the arrow in FIG. 17D.) More specifically, the top walkway portion of the tank 1700 is level with a top of the battery box or other vehicle structure portion 1706, for forming a top continuous portion of the raised walkway 1702. The tank 1700 extends from the vehicle structure portion 1706 along the cab 1712, and terminates at a step portion 1707 of the tank, which has a reduced height in comparison with the top of the tank and vehicle structure portion. (More specifically, with respect to the lower deck 1710, the tank has two heights. The first height is equal to a height of the vehicle structure portion 1706. The second height, of the step portion 1707, is smaller than the first height, but above the lower deck.) The step portion 1707 provides a transition for human operators to traverse from the top of the tank and vehicle structure portion to the lower deck 1710. In this way, the urea tank forms part of a platform of a walkway to a side of the vehicle, on an exterior of the operator cab.

Figure 17C:
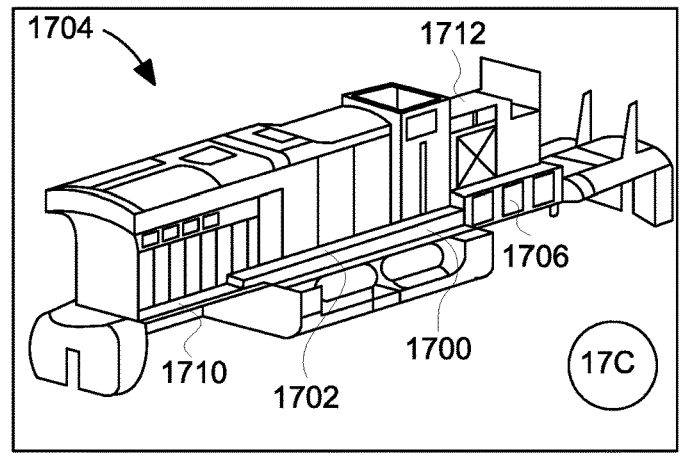

FIG. 17C is a perspective view of a second embodiment of a tank 1700 configured as a raised walkway 1702. The tank 1700 abuts a battery box or other vehicle structure portion 1706, extends along one side of the vehicle (e.g., the "A" side of a locomotive), and terminates proximate a rear portion of the vehicle. The tank 1700 is a rectangular parallelepiped (e.g., in effect encompasses six rectangular or square faces), and has a height, with respect to the lower deck 1710, that is less than a height of the vehicle structure portion 1706 (with respect to the lower deck 1710). Thus, the whole tank 1700 acts as a step transition between the top surface of the vehicle structure portion 1706 and the lower deck 1710.

Figure 17D:
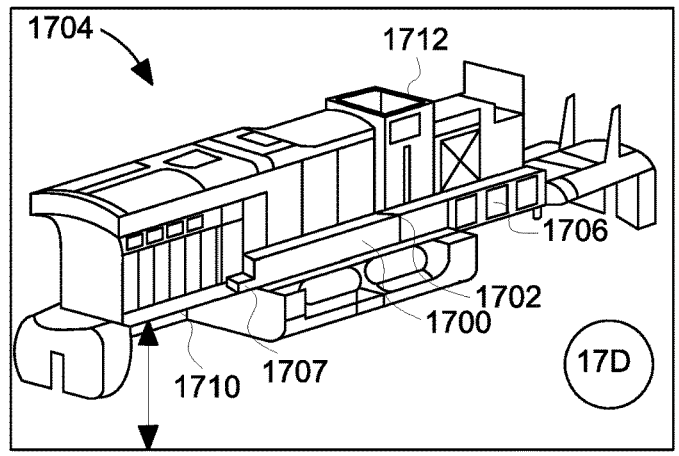

FIG. 17D is a perspective view of a third embodiment of a tank 1700 configured as a raised walkway 1702. This embodiment is similar to the embodiment in FIG. 17B, but illustrates that (i) the tank 1700 can be provided in different lengths, and (ii) that the positioning/length of the vehicle structure portion 1706 (which the tank 1700 abuts) can vary from vehicle to vehicle.

Figure 17E:
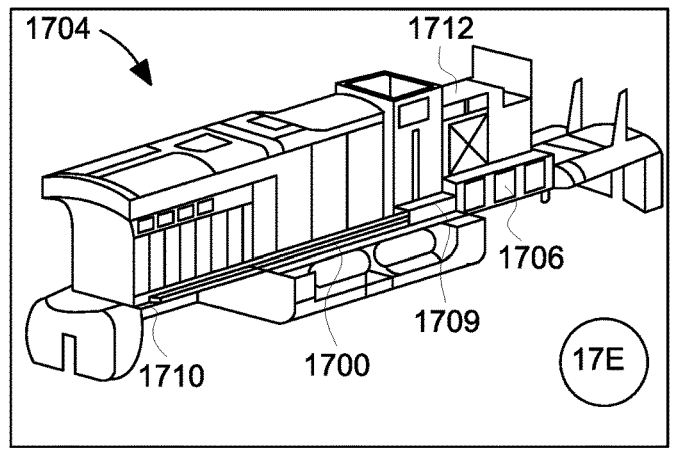

FIG. 17E is a perspective view of a fourth embodiment of a tank 1700 configured as a raised walkway 1702. This embodiment is similar to the embodiment in FIG. 17C, but illustrates that (i) the tank 1700 can be provided in different lengths, and (ii) other structural elements 1709 of the vehicle, at the same height as the tank, may be interposed between the tank and the vehicle structure portion 1706.

Figure 17F:
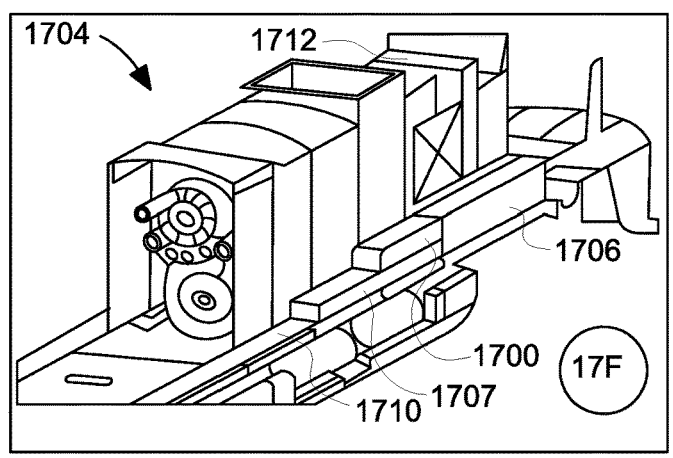

FIG. 17F is a perspective view of a fifth embodiment of a tank 1700 configured as a raised walkway 1702. This embodiment is similar to the embodiment in FIGS. 17B and 17D, but illustrates that the step portion 1707 can be provided in different lengths.

In any of the embodiments set forth herein, for being configured as a raised walkway, the tank 1700 may have one or more of the following features: (i) top surfaces configured as walkway surfaces, e.g., anti-skid/slip surfaces; (ii) the tank structure (e.g., top/bottom/side walls and any internal supports) is configured to both hold urea and to support the weight of plural human operators; and/or (iii) the tank structure comprises structural elements for supporting the weight of plural human operators, but those same structural elements are not used for holding urea, and the tank further includes an interior member that holds urea but does not act for walkway support (e.g., the tank comprises an external structure and an internal vessel; the external structure forms part of the walkway for supporting human operators; the internal vessel holds urea but does not bear or support weight present upon the walkway). Additionally, the tank may be installed in a single sided configuration, meaning the only urea tank 1700 in the vehicle is positioned on one side of the vehicle (the sides being defined as left or right of a longitudinal axis of the vehicle).

Multiple urea heating systems may be included for freeze-prevention during locomotive use. In one embodiment, the freeze prevention system may include a first resistive heater (e.g., submersible resistive heater) that can deliver 1000-1200 W at 74V (DC) from the locomotive bus. The freeze prevention system may enable the urea to be kept in a liquid state even when ambient temperatures dip to −40° C. Urea thawing may be needed in the case of a locomotive shutdown, such as when the locomotive has been shutdown for a number of days while being exposed to temperatures below −10° C. In one embodiment, to address the thawing, a second resistive heater (e.g., submersible resistive heater) may be included that can provide 6000-10,000 W at 240V (AC) from a way-side power source (such as, a wayside locomotive repair shop). In one example, the second submersible heater can completely thaw a full tank of urea in approximately 24 hours.

In one embodiment, only a fraction of the urea flow (or flow of other reductant), delivered to the exhaust after-treatment system from the urea tank by the urea injectors of the urea delivery system, is injected into the after-treatment system for mixing, hydrolysis, and subsequent NOx reduction. In this embodiment, the remaining un-injected fraction of the urea flow is used to cool the urea injectors before being returned to the urea tank. Such an embodiment may include urea delivery lines, urea return lines, urea injectors, urea transfer pumps, filters, and heaters. The urea delivery system according to such an embodiment may be selected based on one or more factors including delivery of urea at sufficient flow and pressure for the desired application, volume requirement that is less than the available packaging volume, and an ability to interact with the urea control system equivalently to current systems (such as with a single pump and a single injector system).

In alternate embodiments, the urea (or other reductant) delivery system may include a single pump with an accumulator system, or a multi-pump system having multiple pumps. The single pump system utilizes an accumulator to hold a volume of pressurized urea available for injection from all six injectors as needed. The accumulator helps to moderate pressure oscillations from the single pump that are more pronounced than those experienced on a system utilizing multiple pumps. In comparison, the multi-pump system utilizes individual pumps for each leg (exhaust after-treatment unit) of the exhaust after treatment system with a potential requirement for a (low-pressure) supply pump to assist in priming. An example multi-pump urea delivery system is shown in FIG. 18. In FIG. 18, a multi-pump reductant delivery system 1800 includes a reductant storage tank 1802, a low-pressure feed/supply pump section 1804 (boost pump section), and a high-pressure pump section 1806 for each leg/unit. (Low pressure and high pressure are relative, meaning the low-pressure pump is a lower pressure than the high-pressure pump.)

As previously mentioned, in some embodiments, the exhaust after-treatment system further includes a delivery system including a delivery line and a delivery pump for receiving reductant from the reductant storage tank, as shown in FIG. 19. In one example, the urea delivery lines may be sized to about 1.5"/~3.8 cm outer diameter each (with a diameter of ~3"/~7.6 cm in a bundle). As shown in FIG. 19, at least a portion of the urea delivery line 1904 of urea delivery system 1902 is mounted along engine block 1908 and along the longitudinal axis 1910 of after-treatment system 1901. By mounting urea delivery lines 1904 on exhaust after-treatment system 1901, engine maintenance disturbances are avoided, as well as avoiding exposing the urea to higher temperatures on the turbocharger end 1914 of engine 1912.

In this way, by configuring an exhaust after-treatment system with a plurality of leg and sub-legs (exhaust after-treatment units), the after-treatment system can be designed to be accommodated within a variety of vehicles. Further, by using cylindrical substrates for each leg, it is possible that further compaction may be achieved without reducing the number of after-treatment components in each leg.

As described herein, certain embodiments of an emissions control system include one or more diesel particulate filters 106 ("DPF"). Alternatively, in any of the embodiments set forth herein, different types of filters may be used (such as flow-thru filters), or it may be the case that no filter is used.

According to one aspect, "distinct" means that exhaust that travels through one passage does not travel through the others (when the passages are arrayed in parallel) and/or that common structure is not shared for defining the passages.

According to one aspect of the invention, the exhaust after-treatment system includes plural exhaust after-treatment units (the units may be arranged for functional operation in parallel), where each unit defines an exhaust flow passage and includes (within or otherwise associated with the passage) a respective plurality of different types of exhaust after-treatment component, e.g., each unit may include a filter, and another type of exhaust after-treatment component different than a filter. That is, a first unit includes a first set of exhaust after-treatment components having a first exhaust after-treatment component and a second exhaust after-treatment component, the first and second components being different types of components from one another; a second unit includes a second set of exhaust after-treatment components having a third exhaust after-treatment component and a fourth exhaust after-treatment component, the third and fourth components being different types of components from one another; etc. The first set may be the same as the second set, or different. (That is, if the first unit includes a first component "A" and a first component "B," with A and B being different types of components from one another, the second unit may include a second component A and a second component B, or the second unit may include A (or B) and a component "C" (of a different type than A or B), or the second unit may include components C and "D," C being a different type of component than D.)

Thus, in an embodiment, an emissions control system comprises an exhaust after-treatment system and a control module. The exhaust after-treatment system comprises plural exhaust treatment units, functionally arranged in parallel (that is, parallel in regards to function, not necessarily that the units are geometrically parallel, although that is an option), where each unit defines an exhaust flow passage and includes (within or otherwise associated with the passage) a respective plurality of different types of exhaust after-treatment components. Inputs of the exhaust treatment units are connected to an exhaust outlet of an engine, for receiving an exhaust stream from the engine. The control module is in communication with the exhaust after-treatment system for controlling at least one of the different types of exhaust after-treatment components in the exhaust treatment units, e.g., for controlling respective injection of an amount of reductant into a portion of the exhaust stream flowing through each of exhaust treatment units.

Figure 20:
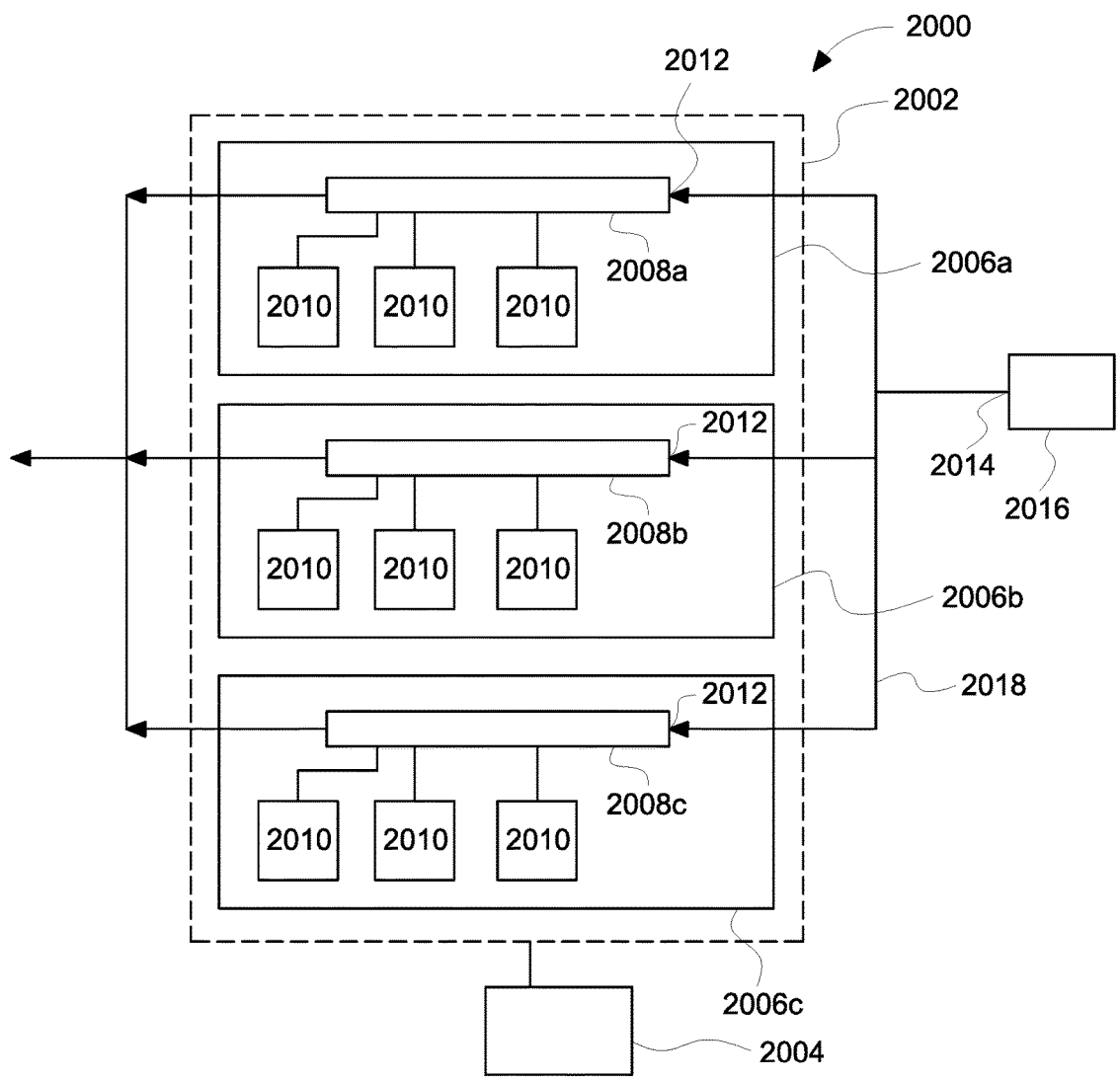

FIG. 20 illustrates an embodiment of such an emissions control system. Here, an emissions control system 2000 comprises an exhaust after-treatment system 2002 and a control module 2004. The exhaust after-treatment system 2002 comprises plural exhaust treatment units 2006a, 2006b, 2006c, functionally arranged in parallel, where each unit 2006a-2006c defines a respective exhaust flow passage 2008a, 2008b, 2008c and includes (within or otherwise associated with the passage) a respective plurality of different types of exhaust after-treatment components 2010. (For clarity of illustration, the exhaust after-treatment components are collectively labeled 2010; however, as described herein, this does not mean the components are necessarily the same. Instead, for a given exhaust treatment unit, the components of the exhaust treatment unit are different from one another.) Inputs 2012 of the exhaust treatment units are connected to an exhaust outlet 2014 of an engine 2016, for receiving an exhaust stream 2018 from the engine. The control module 2004 is in communication with the exhaust after-treatment system 2002 for controlling at least one of the different types of exhaust after-treatment components 2010 in the exhaust treatment units, e.g., for controlling respective injection of an amount of reductant into a portion of the exhaust stream flowing through each of exhaust treatment units. Although FIG. 20 shows three exhaust treatment units, the system may include two, or more than three, exhaust treatment units. Additionally, although FIG. 20 shows three exhaust after-treatment components associated with each exhaust treatment unit, each unit may have two or more than three exhaust after-treatment components.

The other figures and associated description herein are applicable, in various embodiments, to the system shown in FIG. 20. For example, each exhaust treatment unit 2006a, 2006b, 2006c may include a PM reduction system 103 and/or an SCR system 107 as shown in FIG. 1.

Another embodiment relates to an emissions control system comprising a control module and an exhaust after-treatment system. The exhaust after-treatment system includes a plurality of exhaust after-treatment units (functionally arranged in parallel or otherwise). Each exhaust after-treatment unit respectively includes at least one substrate, a particulate matter reduction system, and a selective catalytic reduction system. The at least one substrate defines an exhaust flow passage; an input of the exhaust flow passage is connectable to an exhaust outlet of an engine (such as an engine in a locomotive or other rail vehicle). The particulate matter reduction system has a diesel particulate filter and a diesel oxidation catalyst upstream of the diesel particulate filter. The selective catalytic reduction system is downstream of the diesel particulate filter. The selective catalytic reduction system has a reductant injector (with an injector output in the exhaust flow passage at an injection site), a selective catalytic reduction catalyst downstream of the injection site, and an ammonia slip catalyst downstream of the selective catalytic reduction catalyst. The control module is configured to communicate with the exhaust after-treatment system for controlling each reductant injector for injection of reductant in the exhaust flow passage at the injection site. In another embodiment of the locomotive, each after-treatment unit further comprises a regeneration device for regenerating the diesel particulate filter; the regeneration device may include a burner.

Figure 21:
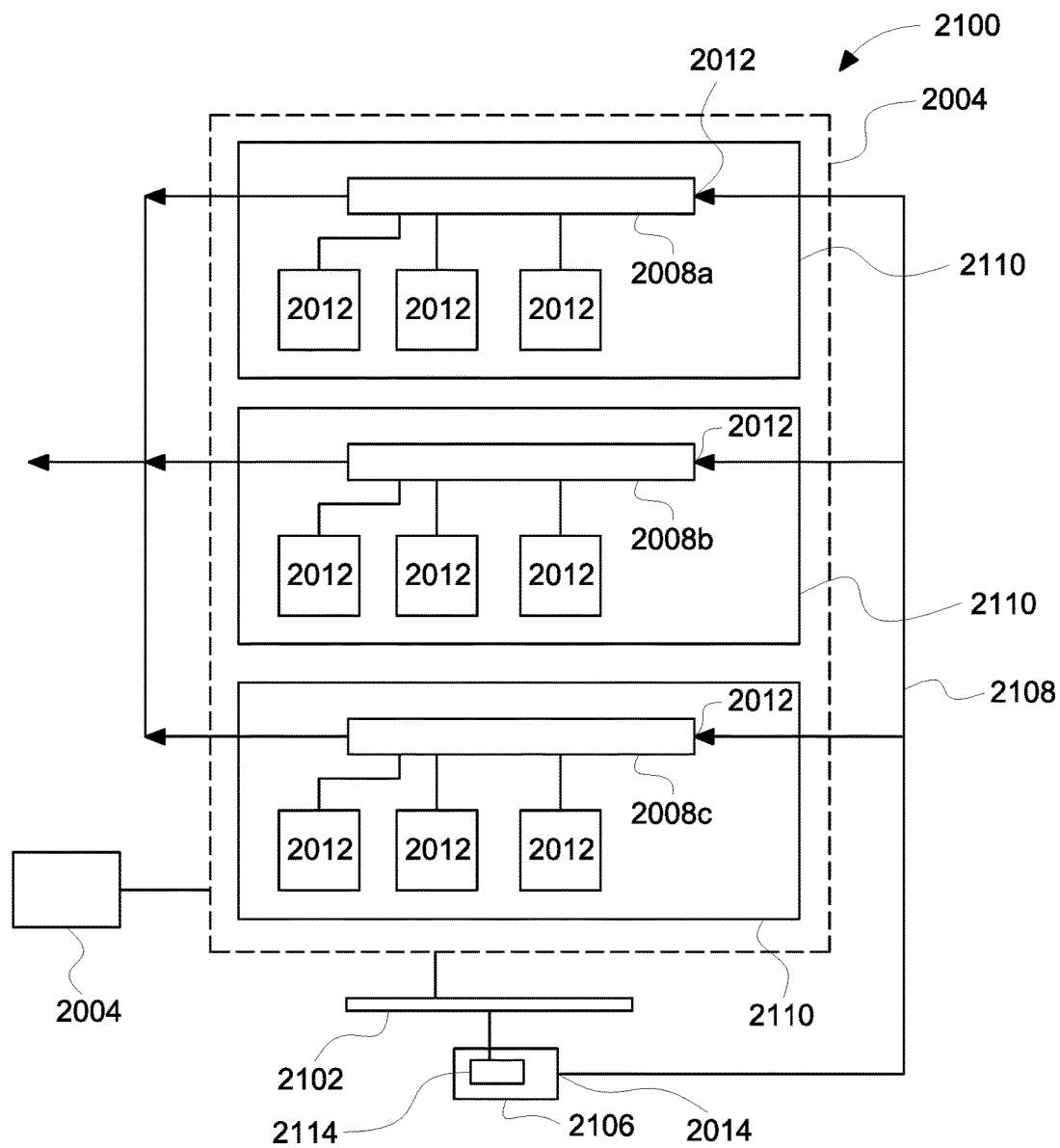
Figure 22:
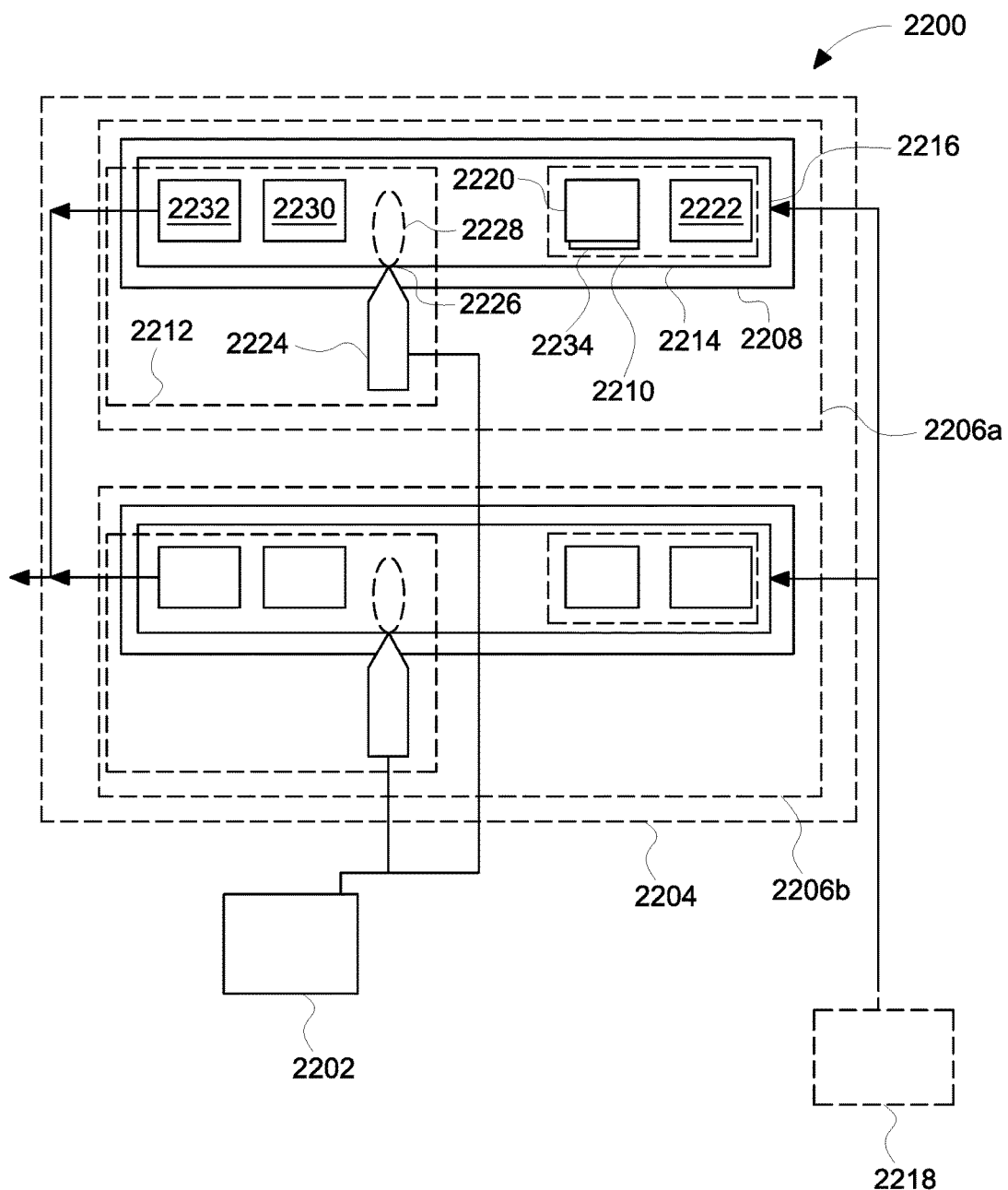

FIG. 22 illustrates an example of an emissions control system 2200 as described immediately above. The emissions control system 2200 includes a control module 2202 and an exhaust after-treatment system 2204. The exhaust after-treatment system 2204 includes a plurality of exhaust after-treatment units 2206a, 2206b; in an embodiment, as shown in FIG. 22, the units are shown functionally arranged in parallel. (Two units 2206a, 2206b are shown in FIG. 21; however, the system may include more than two such units.) Each exhaust after-treatment unit 2206a, 2206b respectively includes at least one substrate 2208, a particulate matter reduction system 2210, and a selective catalytic reduction system 2212. The at least one substrate 2208 defines an exhaust flow passage 2214; an input 2216 of the exhaust flow passage is connectable to an exhaust outlet of an engine 2218 (such as an engine in a locomotive or other rail vehicle). The particulate matter reduction system 2210 has a diesel particulate filter 2220 and a diesel oxidation catalyst 2222 upstream of the diesel particulate filter. The selective catalytic reduction system 2212 is downstream of the diesel particulate filter 2220. The selective catalytic reduction system 2212 has a reductant injector 2224 (with an injector output 2226 in the exhaust flow passage at an injection site 2228), a selective catalytic reduction catalyst 2230 downstream of the injection site, and an ammonia slip catalyst 2232 downstream of the selective catalytic reduction catalyst. The control module 2202 is configured to communicate with the exhaust after-treatment system for controlling each reductant injector for injection of reductant in the exhaust flow passage at the injection site. In another embodiment of the locomotive, each after-treatment unit 2206a, 2206b further comprises a regeneration device 2234 for regenerating the diesel particulate filter; the regeneration device may include a burner. (In FIG. 22 the sub-elements of the after-treatment unit 2206b are not numbered, for clarity of illustration, but, in an embodiment, are the same as those of unit 2206a.)

Another embodiment relates to a method of operating an exhaust after-treatment system. The method includes a step of dividing an exhaust stream from an engine into a plurality of exhaust sub-streams. The method additionally includes a step of respectively routing the plurality of sub-streams through a plurality of exhaust after-treatment units. The method additionally includes, in each exhaust after-treatment unit, a step of treating the exhaust sub-stream routed through the exhaust after-treatment unit using a first exhaust after-treatment component of the exhaust after-treatment unit.

In another embodiment of the method, the first exhaust after-treatment component comprises a reductant injector.

The method further includes a step of injecting reductant into each of the plurality of sub-streams. In this manner, the exhaust sub-streams are treated through chemical alteration of a predetermined chemical component of the exhaust stream in response to the injected reductant.

In another embodiment, the method further includes a step of, in each exhaust after-treatment unit, filtering the exhaust sub-stream routed through the exhaust after-treatment unit prior to the exhaust sub-stream encountering the injected reductant. The filtration step may be performed using a filter, and the method may further include a step of regenerating the filter with a burner.

Figure 23:
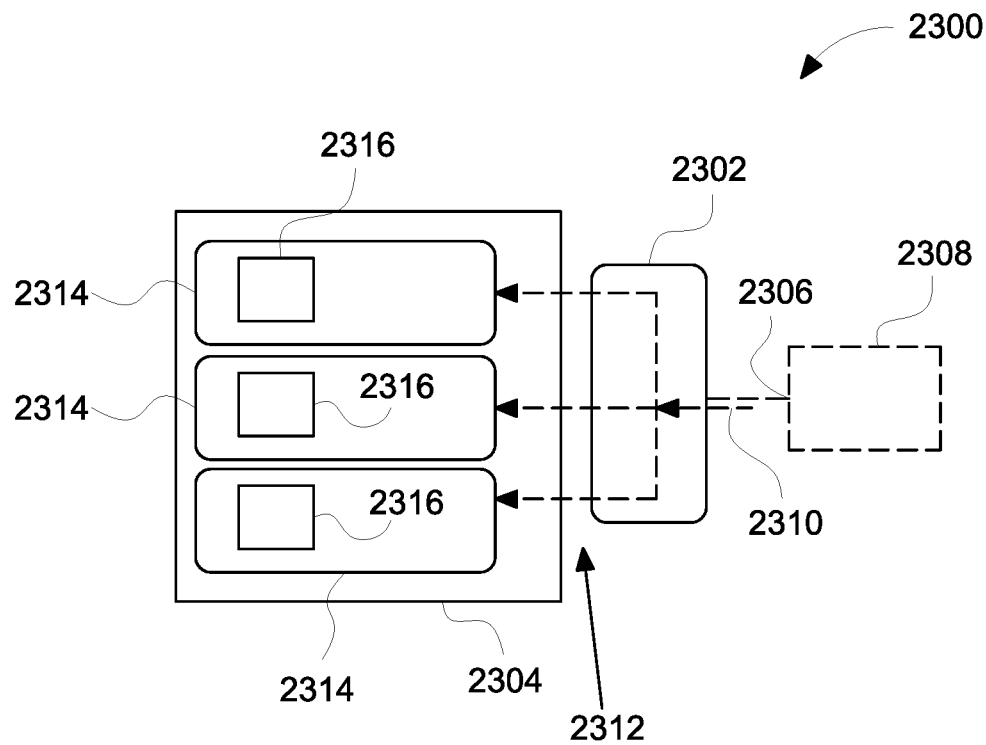

Another embodiment relates to an emissions control system having a transition section and an exhaust after-treatment system. The transition section is attachable to an exhaust outlet of an engine and configured to divide an exhaust stream exiting the exhaust outlet into plural exhaust sub-streams. The exhaust after-treatment system has a plurality of exhaust after-treatment units through which the plural exhaust sub-streams can be directed to respectively flow. Each exhaust after-treatment unit has at least one exhaust after-treatment component for treating a portion of the exhaust sub-stream flowing through the unit. Portions of FIGS. 1-22 are applicable to such an emissions control system. FIG. 23 shows another embodiment. Here, an emissions control system 2300 includes a transition section 2302 and an exhaust after-treatment system 2304. The transition section 2302 is attachable to an exhaust outlet 2306 of an engine 2308 and configured to divide an exhaust stream 2310 exiting the exhaust outlet into plural exhaust sub-streams 2312. The exhaust after-treatment system 2304 has a plurality of exhaust after-treatment units 2314 through which the plural exhaust sub-streams can be directed to respectively flow. Each exhaust after-treatment unit 2314 has at least one exhaust after-treatment component 2316 for treating a portion of the exhaust sub-stream flowing through the unit. In another embodiment, each exhaust after-treatment unit 2314 includes a particulate matter reduction system having a diesel particulate filter and a diesel oxidation catalyst upstream of the diesel particulate filter, and a selective catalytic reduction system downstream of the diesel particulate filter and having a reductant injector with an injector output in the exhaust flow passage at an injection site, a selective catalytic reduction catalyst downstream of the injection site, and an ammonia slip catalyst downstream of the selective catalytic reduction catalyst (such as shown in FIG. 1).

In another embodiment, an emissions control system includes a support structure and an exhaust after-treatment system. The support structure is at least partially positioned above an engine. (The engine is capable of producing an exhaust stream.) The exhaust after-treatment system has at least one exhaust after-treatment unit through which at least a portion of the exhaust stream is directed to flow. Each exhaust after-treatment unit has at least one exhaust after-treatment component for treating the portion of the exhaust stream flowing through the unit. The exhaust after-treatment unit is attached to the support structure and positioned above the engine. Portions of FIGS. 1-20 and 22-23 are applicable to such an emissions control system. FIG. 21 shows another embodiment. Here, an emissions control system 2100 includes a support structure 2102 and an exhaust after-treatment system 2104. The support structure 2102 is at least partially positioned above an engine 2106. (The engine 2106 is capable of producing an exhaust stream 2108.) The exhaust after-treatment system 2104 has at least one exhaust after-treatment unit 2110 through which at least a portion of the exhaust stream is directed to flow. Each exhaust after-treatment unit 2110 has at least one exhaust after-treatment component 2112 for treating the portion of the exhaust stream flowing through the unit. Each of the at least one exhaust after-treatment unit is attached to the support structure 2102 and positioned above the engine.

In an embodiment, other parts of the system 2100 as shown in FIG. 21 are as described with respect to FIG. 20.

In another embodiment of an emissions control system, the exhaust after-treatment system 2104 includes a plurality of exhaust after-treatment units 2110. The system 2100 further comprises a transition section attached to an exhaust outlet of the engine that divides the exhaust stream into plural exhaust sub-streams respectively directed through the plurality of exhaust after-treatment units. (See FIG. 23 and related description as an example.) The plurality of exhaust after-treatment units are attached to the support structure and positioned above the engine.

In another embodiment of an emissions control system, the support structure 2102 is attached to the engine 2106. For example, the support structure 2102 may be attached to a frame, engine block, cover, or other load-bearing portion 2114 of the engine, which is capable of bearing the weight of the support structure and exhaust treatment unit(s) without damage to the engine. In an embodiment, the support structure 2102 is attached to one or more parts of the engine that are capable of bearing at least 5000 pounds/~2250 kg without damage, which is a typical weight for relatively large sized components (support structure, exhaust after-treatment units, transition section) used in conjunction with a locomotive or similar diesel engine. This embodiment is applicable to an exhaust after-treatment system with one exhaust after-treatment unit (leg) or with plural exhaust after-treatment units.

In another embodiment of an emissions control system, where the support structure 2102 is attached to the engine 2106, the support structure includes a base and a plurality of mounting legs. The plurality of mounting legs are respectively attached to the engine at a plurality of different mounting locations, and the base is attached to the legs (e.g., to distal ends of the legs) and positioned above the engine. The exhaust after-treatment unit(s) is directly or indirectly attached to the base, that is, directly connected to the base, or connected to elements that are in turn connected to the base. Examples of such an arrangement are shown in FIGS. 9A-9C.

In another embodiment of an emissions control system, the support structure comprises a plurality of isolators. Each exhaust after-treatment unit is attached to one or more of the isolators above the engine for vibration reduction. For example, the isolators may be attached to the base, and the exhaust after-treatment unit(s) attached to the isolators. Example isolators 915, 915a, 915b are shown and described in FIGS. 9B-9C and related description.

The isolators may be metallic isolators, as described above. Alternatively or additionally, the plurality of isolators may include one or more first isolators and one or more second isolators; the first isolators and the second isolators are different types of isolators. Here, each exhaust after-treatment unit is attached to at least one of the first isolators and to at least one of the second isolators. For example, the first isolators may be a first type of metallic isolator (e.g., wire mesh isolators) and the second isolators may be a second, different type of metallic isolator (e.g., cable-mounted isolators). In another embodiment, the first isolators are relatively stiff isolators (more resistance to movement), and the second isolators are relatively soft isolators (less resistance to movement). In another embodiment, the first isolators are adapted for accommodating a buff load of the exhaust after-treatment system, and the second isolators are adapted for accommodating thermal expansion of the exhaust after-treatment system. For example, depending on the particular component used, relatively stiff isolators (e.g., wire mesh isolators) may be better adapted to accommodating a buff load, and relatively soft isolators (e.g., cable-mounted isolators) may be better adapted to accommodating thermal expansion.

Example isolator configurations are further explained in regards to FIGS. 9A-9C and related description. FIGS. 24 and 25 additionally illustrate two embodiments of a cable-mounted isolator configuration. In FIG. 24, a cable-mounted isolator 2400 (shown in side elevation view) is attached to the base 2402 of a support structure (such as mountable to and/or above an engine). In turn, an exhaust after-treatment unit 2404 is attached to the cable-mounted isolator 2400. In this manner, the exhaust after-treatment unit 2404 is attached to and supported by the base 2402, but the amount of vibration transferred from the base to the unit (such as generated by operation of the engine) is reduced, and thermal expansion is accommodated. In FIG. 25, a cable-mounted isolator 2500 (shown in perspective view) is attached to a support member 2502, which is in turn attached to the base 2504 of a support structure. A mounting bracket 2506 is attached to the cable-mounted isolator 2500. The mounting bracket 2506 supports, and/or is part of, an exhaust after-treatment unit 2508. FIG. 26 additionally illustrates a configuration with a wire mesh isolator. Here, a wire mesh isolator 2600 (shown in side elevation view) is attached to the base 2602 of a support structure (such as mountable to and/or above an engine). In turn, an exhaust after-treatment unit 2604 is attached to the wire mesh isolator 2600. The wire mesh isolator includes a wire mesh element that interconnects and/or buffers two end connector elements, e.g., the wire mesh element is sandwiched between and attached to the end connector elements for conferring a degree of movement there between.

In another embodiment, an emissions control system includes a support structure and an exhaust after-treatment system. The support structure includes a base, a plurality of mounting legs, and a plurality of isolators. The mounting legs are respectively attached to an engine at a plurality of different mounting locations. The base is attached to the legs and positioned above the engine. The isolators are attached to the base. The exhaust after-treatment system includes a plurality of exhaust after-treatment units through which an exhaust stream of the engine is directed to flow. Each exhaust after-treatment unit has at least one exhaust after-treatment component for treating a portion of the exhaust stream flowing through the unit. The plurality of isolators includes plural first isolators and plural second isolators; the first isolators and the second isolators are different types of isolators. Each of the exhaust after-treatment units is attached to at least one of the first isolators and to at least one of the second isolators. For example, each exhaust after-treatment unit may be attached to the base by way of (i) at least one wire mesh isolator or other relatively stiff isolator and (ii) at least one cable-mounted isolator or other relatively soft isolator. As another example, each exhaust after-treatment unit may be attached to the base by way of only one wire mesh isolator or other relatively stiff isolator and plural cable-mounted isolators or other relatively soft isolators.

Figure 27:
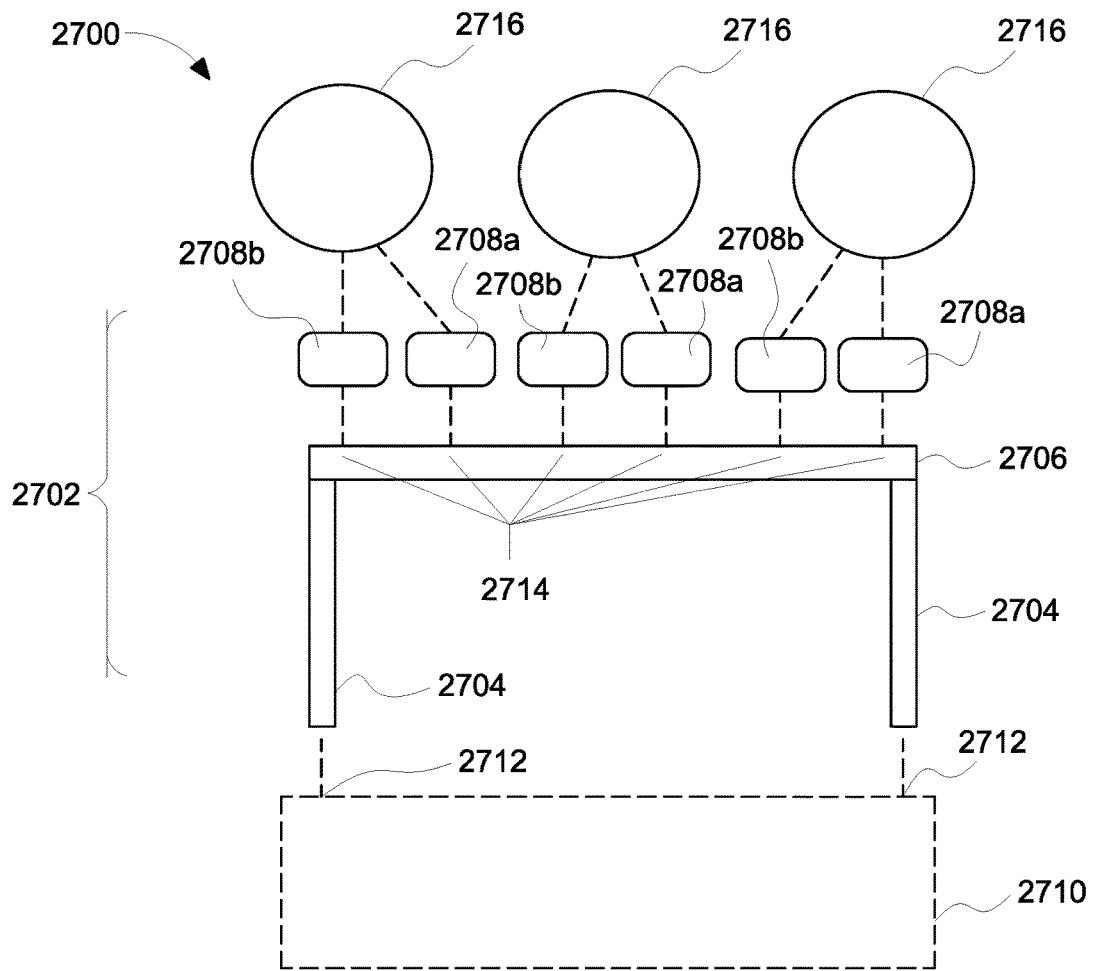

With reference to FIG. 27, another embodiment relates to an emissions control system 2700. The system 2700 includes a support structure 2702. The support structure 2702 includes a plurality of mounting legs 2704, a base 2706 attached to the legs (e.g., attached to distal ends of the legs), and a plurality of isolators 2708a, 2708b for attachment to the base 2706. The mounting legs 2704 are spaced apart for mounting to an engine 2710 at a plurality of different mounting locations 2712 and positioning of the base above the engine. The plurality of isolators 2708a, 2708b comprises plural first isolators 2708a and plural second isolators 2708b; the first isolators and the second isolators are different types of isolators. The base 2706 includes an array of attachment points 2714 for the plurality of isolators, for each of a plurality of exhaust after-treatment units 2716 to be attached to the base by way of at least one of the first isolators 2708a and at least one of the second isolators 2708b.

Another embodiment relates to a rail vehicle (e.g., locomotive) system. The rail vehicle system includes an engine cab defined by a roof assembly and side walls, an engine positioned in the engine cab such that a longitudinal axis of the engine is aligned in parallel to a length of the engine cab, and an exhaust after-treatment system. The exhaust after-treatment system defines a plurality of distinct exhaust flow passages. Each of the plurality of exhaust flow passages is configured to receive at least some exhaust gas from an exhaust manifold of the engine. The exhaust after-treatment system is mounted above the engine within a space defined by a top surface of the engine exhaust manifold, the roof assembly, and the side walls of the engine cab, such that a longitudinal axis of the exhaust after-treatment system is aligned at least generally parallel to the longitudinal axis of the engine.

In another embodiment of the rail vehicle system, the plurality of distinct exhaust flow passages are aligned at least generally parallel to each other, and at least generally parallel to the longitudinal axis of the exhaust after-treatment system.

In another embodiment of the rail vehicle system, the system further includes a support structure attached to the engine. The support structure comprises a base and a plurality of mounting legs. The mounting legs are respectively attached to the engine at a plurality of different mounting locations. The base is attached to the legs and positioned above the engine. At least one of the exhaust flow passages of the exhaust after-treatment system is attached to the base and positioned above the engine.

In another embodiment of the rail vehicle system, the plurality of mounting locations include at least some locations on an engine block of the engine and at least some locations on a front end of the engine.

In another embodiment of the rail vehicle system, the roof assembly includes a plurality of roof panels that are hingedly-attached to (hinged to) a side wall of the engine cab such that the exhaust after-treatment system is accessible through at least one of the plurality of hingedly-attached roof panels.

In another embodiment of the rail vehicle system, the roof panels are of substantially equal dimensions. Alternatively, the plurality of roof panels includes a first larger panel and a second smaller panel.

In another embodiment, the rail vehicle system additionally includes a horn system with one or more horns positioned above the engine within the engine cab, at a front end of the engine cab between the exhaust after-treatment system and a front wall of the cab. An open end of at least one horn faces towards a center of the engine cab.

Other details of the rail vehicle system described immediately above can be referenced from the figures and accompanying description.

Another embodiment relates to a vehicle system. The vehicle system includes a walkway and a tank. The walkway has a support frame. The support frame defines a walkway surface and is configured to accommodate at least the weight of an average human adult (at least 90 kg). The tank is positioned within an interior of the support frame, and is configured to hold liquid (e.g., urea/DEF or other reductant). Further information relating to the vehicle system, in various embodiments, can be found in FIGS. 12-17F and related description; see also FIG. 28 and related description.

In another embodiment of the vehicle system, the walkway surface is planar and has a length and a width, the length being longer than the width, and the width being at least wide enough to accommodate the average human adult walking along the walkway (at least 1"/0.3 m wide). Further information relating to the vehicle system of this embodiment can be found in FIGS. 17A-17F and related description.

In another embodiment of the vehicle system, the support frame defines a step in the walkway surface, the step transitioning from a first level of the walkway to a second level of the walkway. Further information relating to the vehicle system of this embodiment can be found in FIGS. 17B, 17D, and 17F and related description.

In another embodiment of the vehicle system, the walkway is a side walkway of the rail vehicle. The side walkway extends from towards a front of the rail vehicle to towards a rear of the rail vehicle, along a side of the rail vehicle. "Towards a front" means starting within the front half of the vehicle, and "towards a rear" means extending rearwards. Further information relating to the vehicle system of this embodiment can be found in FIGS. 17A-17F and related description.

With reference to FIG. 28, another embodiment relates to a vehicle system 2800. The vehicle system 2800 includes a walkway 2802 and a tank 2804. The walkway has a support frame 2806. The support frame 2806 defines a walkway surface 2808 and is configured to accommodate at least the weight of an average human adult. The tank 2804 is positioned within an interior of the support frame, and is configured to hold liquid 2810 (e.g., urea or other reductant). The tank 2804 is an interior surface 2812 of the support frame. The support frame thereby both supports (at least) an average human adult and defines a volume of the tank.

In another embodiment of a vehicle system, the system further includes a first resistive heater (e.g., submersible resistive heater) in thermal connection with the tank and configured to be driven by an electrical bus of a vehicle for heating the liquid (e.g., urea or other reductant) at a first heat output (e.g., wattage). In another embodiment, the vehicle system further includes a second resistive heater (e.g., submersible resistive heater) in thermal connection with the tank and configured to be driven by an off-vehicle electrical power source for heating the liquid (e.g., urea or other reductant) at a second heat output. The second heat output is greater than the first heat output. Either embodiment (first and/or second resistive heater) is applicable for use in conjunction with any of the other embodiments set forth herein. As one example, however, with reference to FIG. 28, a first resistive heater 2814 is in thermal connection with the tank and configured to be driven by an electrical bus 2816 of a vehicle for heating the liquid (e.g., urea or other reductant) at a first heat output (e.g., wattage). A second resistive heater 2818 is in thermal connection with the tank and configured to be driven by an off-vehicle electrical power source 2820 for heating the liquid (e.g., urea or other reductant) at a second heat output. As noted, the second heat output may be greater than the first heat output. Other information relating to these embodiments can be found in the sections above relating to the urea heating systems.

Another embodiment relates to a rail vehicle. The rail vehicle comprises a walkway and a tank. The walkway has a support frame. The support frame defines a walkway surface and is configured to accommodate at least the weight of an average human adult. The tank is positioned within an interior of the support frame, and is configured to hold liquid (e.g., urea or other reductant). In an embodiment, the tank is fluidly attached to an emissions control system of the rail vehicle for delivering the urea or other reductant to the emissions control system. In an embodiment, the tank is the only tank in the rail vehicle for holding urea or other reductant.

In another embodiment, a vehicle system includes an engine cab, an engine, and an exhaust after-treatment system. The engine cab is defined by a roof assembly and side walls. The engine is positioned in the engine cab such that a longitudinal axis of the engine is aligned in parallel to a length of the engine cab. The exhaust after-treatment system defines at least one exhaust flow passage. The at least one exhaust flow passage is configured to receive exhaust gas from an exhaust manifold of the engine. The exhaust after-treatment system is mounted such that a longitudinal axis of the exhaust after-treatment system is aligned at least generally parallel to the longitudinal axis of the engine. The exhaust after-treatment system includes a reductant storage tank, and, for each exhaust flow passage, a respective reductant injector configured to inject a reductant from the reductant storage tank into an injection site in the exhaust flow passage. The reductant storage tank forms at least part of an exterior operator walkway positioned on a side of the engine cab.

In another embodiment, the exhaust after-treatment system further includes a delivery system with a delivery line and a delivery pump for receiving reductant from the reductant storage tank. At least a portion of the delivery line is mounted along an engine block and along the longitudinal axis of the exhaust after-treatment system.

Another embodiment relates to an emissions control system. The emissions control system includes a reductant (e.g., urea) delivery system for delivering reductant to a reductant injector. The reductant delivery system is configured to control delivery of the reductant to the reductant injector such that a flow rate of the delivered reductant is greater than a rate of reductant injected by the reductant injector. The reductant delivery system includes a flow path for routing an un-injected portion of the delivered reductant to cool the reductant injector prior to returning to a reductant storage tank.

In another embodiment, a vehicle system includes an engine cab, an engine, and an exhaust after-treatment system. The engine cab is defined by a roof assembly and side walls. The engine is positioned in the engine cab such that a longitudinal axis of the engine is aligned in parallel to a length of the engine cab. The exhaust after-treatment system defines at least one exhaust flow passage. The at least one exhaust flow passage is configured to receive exhaust gas from an exhaust manifold of the engine. The exhaust after-treatment system is mounted such that a longitudinal axis of the exhaust after-treatment system is aligned at least generally parallel to the longitudinal axis of the engine. The exhaust after-treatment system includes a reductant storage tank, and, for each exhaust flow passage, a respective reductant injector configured to inject a reductant from the reductant storage tank into an injection site in the exhaust flow passage. The exhaust after-treatment system also includes a reductant (e.g., urea) delivery system for delivering reductant to the reductant injector(s). The reductant delivery system is configured to control delivery of the reductant to the reductant injectors such that a flow rate of the delivered reductant is greater than a rate of reductant injected by the reductant injectors. The reductant delivery system includes a flow path for routing an un-injected portion of the delivered reductant to cool the reductant injectors prior to returning to a reductant storage tank.

Another embodiment relates to an emissions control system. The emissions control system includes an exhaust after-treatment system having plural reductant injectors and a reductant delivery system for delivering reductant to the plural reductant injectors. The reductant delivery system comprises one of: a single pump and an accumulator system, where the single pump is configured to pump the reductant to the accumulator system and the accumulator system is configured to hold pressurized reductant available for injection by the plural reductant injectors as needed; or plural pumps for respectively delivering the reductant to the plural reductant injectors.

In another embodiment, the reductant delivery system further includes a reductant supply line for routing reductant from a reductant tank to the injectors. At least part of the reductant supply line is routed along an engine block of an engine whose exhaust is to be treated by the exhaust after-treatment system and at least part of the reductant supply line is routed along the exhaust after-treatment system.

Another embodiment relates to an emissions control system, comprising a control module and an exhaust after-treatment system with a plurality of exhaust after-treatment units, wherein. Each exhaust after-treatment unit respectively comprises: at least one substrate defining an exhaust flow passage, where an input of the exhaust flow passage is connectable to an exhaust outlet of an engine; a particulate matter reduction system having a diesel particulate filter and a diesel oxidation catalyst upstream of the diesel particulate filter; and a selective catalytic reduction system downstream of the diesel particulate filter and having a reductant injector with an injector output in the exhaust flow passage at an injection site, a selective catalytic reduction catalyst downstream of the injection site, and an ammonia slip catalyst downstream of the selective catalytic reduction catalyst. The control module is configured to communicate with the exhaust after-treatment system for controlling each reductant injector for injection of reductant in the exhaust flow passage at the injection site. In another embodiment, each exhaust after-treatment unit further comprises a regeneration device for regenerating the diesel particulate filter, the regeneration device including a burner.

Another embodiment relates to a method of operating an exhaust after-treatment system. The method includes dividing an exhaust stream from an engine into a plurality of exhaust sub-streams; respectively routing the plurality of sub-streams through a plurality of exhaust after-treatment units; and in each exhaust after-treatment unit, treating the exhaust sub-stream routed through the exhaust after-treatment unit using a first exhaust after-treatment component of the exhaust after-treatment unit. In another embodiment, the first exhaust after-treatment component comprises a reductant injector, and the method further comprises injecting reductant into each of the plurality of sub-streams, whereby the exhaust sub-streams are treated through chemical alteration of a determined chemical component of the exhaust stream in response to the injected reductant. In another embodiment, the method further comprises, in each exhaust after-treatment unit, filtering the exhaust sub-stream routed through the exhaust after-treatment unit prior to the exhaust sub-stream encountering the injected reductant. In another embodiment, the exhaust sub-stream is filtered using a filter, and the method further comprises regenerating the filter with a burner.

Another embodiment relates to an emissions control system. The system comprises a transition section attachable to an exhaust outlet of an engine and configured to divide an exhaust stream exiting the exhaust outlet into plural exhaust sub-streams, and an exhaust after-treatment system having a plurality of exhaust after-treatment units through which the plural exhaust sub-streams can be directed to respectively flow. Each exhaust after-treatment unit has at least one exhaust after-treatment component for treating a portion of the exhaust sub-stream flowing through the unit. In another embodiment, each exhaust after-treatment unit includes a particulate matter reduction system having a diesel particulate filter and a diesel oxidation catalyst upstream of the diesel particulate filter, and a selective catalytic reduction system downstream of the diesel particulate filter and having a reductant injector with an injector output in the exhaust flow passage at an injection site, a selective catalytic reduction catalyst downstream of the injection site, and an ammonia slip catalyst downstream of the selective catalytic reduction catalyst.

Another embodiment relates to an emissions control system. The system includes a support structure comprising a base, a plurality of mounting legs, and a plurality of isolators, the plurality of mounting legs respectively attached to an engine at a plurality of different mounting locations, and the base attached to the legs and positioned above the engine, wherein the isolators are attached to the base. The system also includes an exhaust after-treatment system having a plurality of exhaust after-treatment units through which an exhaust stream of the engine is directed to flow, each exhaust after-treatment unit having at least one exhaust after-treatment component for treating a portion of the exhaust stream flowing through the unit. The plurality of isolators comprises plural first isolators and plural second isolators, the first isolators and the second isolators being different types of isolators. Each of the exhaust after-treatment units is attached to at least one of the first isolators and to at least one of the second isolators. In another embodiment, the first isolators are wire mesh isolators, and the second isolators are cable-mounted isolators.

Another embodiment relates to an emissions control system. The system includes a support structure comprising a plurality of mounting legs, a base attached to the legs, and a plurality of isolators for attachment to the base, the plurality of mounting legs spaced apart for mounting to an engine at a plurality of different mounting locations and positioning of the base above the engine. The plurality of isolators comprises plural first isolators and plural second isolators, the first isolators and the second isolators being different types of isolators. The base includes an array of attachment points for the plurality of isolators, for each of a plurality of exhaust after-treatment units to be attached to the base by way of at least one of the first isolators and at least one of the second isolators.

Another embodiment relates to a rail vehicle system. The system includes an engine cab defined by a roof assembly and side walls, an engine positioned in the engine cab such that a longitudinal axis of the engine is aligned in parallel to a length of the engine cab, and an exhaust after-treatment system defining a plurality of distinct exhaust flow passages. Each of the plurality of exhaust flow passages is configured to receive at least some exhaust gas from an exhaust manifold of the engine. The exhaust after-treatment system is mounted above the engine within a space defined by a top surface of the engine exhaust manifold, the roof assembly, and the side walls of the engine cab such that a longitudinal axis of the exhaust after-treatment system is aligned at least generally parallel to the longitudinal axis of the engine. In another embodiment, the plurality of distinct exhaust flow passages are aligned at least generally parallel to each other, and at least generally parallel to the longitudinal axis of the exhaust after-treatment system. In another embodiment, the rail vehicle system further comprises a support structure attached to the engine. The support structure comprises a base and a plurality of mounting legs. The mounting legs are respectively attached to the engine at a plurality of different mounting locations, and the base is attached to the legs and positioned above the engine. At least the exhaust flow passages of the exhaust after-treatment system are attached to the base and positioned above the engine. In another embodiment, the mounting locations include at least some locations on an engine block of the engine and at least some locations on a front end of the engine. In another embodiment, the roof assembly includes a plurality of roof panels hingedly-attached to a side wall of the engine cab such that the exhaust after-treatment system is accessible through at least one of the plurality of hingedly-attached roof panels. In another embodiment, the plurality of roof panels are of substantially equal dimensions, or wherein the plurality of roof panels includes a first larger panel and a second smaller panel. In another embodiment, the rail vehicle system further comprises a horn system including one or more horns positioned above the engine within the engine cab, at a front end of the engine cab between the exhaust after-treatment system and a front wall of the cab. An open end of at least one horn faces towards a center of the engine cab.

Another embodiment relates to a vehicle system. The vehicle system includes a engine cab defined by a roof assembly and side walls, an engine positioned in the engine cab such that a longitudinal axis of the engine is aligned in parallel to a length of the engine cab, and an exhaust after-treatment system defining at least one exhaust flow passage. The at least one exhaust flow passage is configured to receive exhaust gas from an exhaust manifold of the engine. The exhaust after-treatment system is mounted such that a longitudinal axis of the exhaust after-treatment system is aligned at least generally parallel to the longitudinal axis of the engine. The exhaust after-treatment system comprises a reductant storage tank, and, for each exhaust flow passage, a respective reductant injector configured to inject a reductant from the reductant storage tank into an injection site in the exhaust flow passage. The reductant storage tank forms at least part of an exterior operator walkway positioned on a side of the engine cab. In another embodiment, the exhaust after-treatment system further includes a delivery system including a delivery line and a delivery pump for receiving reductant from the reductant storage tank. At least a portion of the delivery line is mounted along an engine block and along the longitudinal axis of the exhaust after-treatment system.

The term "control module" refers to one or more hardware elements and/or software elements configured for carrying out the indicated function of the control module. The hardware elements may include one or more electronic devices or components, such as a microcontroller or processor and related components. Software refers to a predetermined list of non-transient, machine readable instructions, stored in a tangible medium, which are used as the basis for controller hardware to carry out one or more designated functions, determined according to the contents of the software instructions. In an embodiment, a control module comprises a processor/controller, related electronic components (e.g., components for providing power to the processor/controller), and software that is executed by the processor/controller to perform one or more designated functions.

The term "generally" parallel as used herein means at or within 5 degrees of parallel. The term "at least generally" parallel means parallel or at or within 5 degrees of parallel. "Parallel (or generally parallel)" is equivalent to stating "at least generally parallel." "Substantially" means the stated dimension/quality but for any manufacturing tolerances/variances. For example, "substantially equal" means equal but for manufacturing tolerances/variances.

In the specification and claims, reference will be made to a number of terms have the following meanings. The singular forms "a", "an", and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial amount or immaterial structure, while still being considered free of the modified term.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be".

The embodiments described herein are examples of articles, compositions, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, compositions and methods that do not differ from the literal language of the claims, and further includes other articles, compositions and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. An emissions control system, comprising:
a support structure at least partially positioned above an engine, the engine capable of producing an exhaust stream, wherein the support structure comprises a base, a plurality of mounting legs, and a plurality of vibration reduction isolators; and
an exhaust after-treatment system having at least one exhaust after-treatment unit through which at least a portion of the exhaust stream is directed to flow, each exhaust after-treatment unit having at least one exhaust after-treatment component for treating the portion of the exhaust stream flowing through the unit;
wherein the plurality of mounting legs are respectively attached at a plurality of different mounting locations to at least one of the engine or a platform on which the engine is supported, the base is attached to all the legs and positioned above the engine, the plurality of isolators are attached to a side of the base, and the at least one exhaust after-treatment unit is attached above the base such that the at least one exhaust after-treatment unit, the base, the isolators, and the legs are interconnected and the plurality of isolators are interposed between the legs and the at least one exhaust after-treatment unit for vibration reduction between the legs and the at least one exhaust after-treatment unit;
wherein the isolators are metallic isolators configured for the vibration reduction, and wherein the metallic isolators comprise at least one of wire mesh isolators or cable-mounted isolators.

2. A locomotive comprising the system of claim 1, wherein the support structure, exhaust after-treatment system, and engine are disposed in the locomotive.

3. The locomotive of claim 2, wherein the exhaust after-treatment system comprises a diesel particulate filter.

4. The system of claim 1, wherein:
the at least one exhaust after-treatment unit of the exhaust after-treatment system comprises a plurality of exhaust after-treatment units;
the system further comprises a transition section attached to an exhaust outlet of the engine that divides the exhaust stream into plural exhaust sub-streams respectively directed through the plurality of exhaust after-treatment units; and
the plurality of isolators are attached to a top side of the base, and the plurality of exhaust after-treatment units are attached to the isolators above the base with the isolators being interposed between the top side of the base and the after-treatment units.

5. A locomotive comprising the system of claim 4, wherein the support structure, exhaust after-treatment system, and engine are disposed in the locomotive.

6. The locomotive of claim 5, wherein the exhaust after-treatment system comprises a diesel particulate filter.

7. A system comprising:
an engine supported on a platform and configured to produce an exhaust stream;
a support structure at least partially positioned above the engine and comprising a base, a plurality of mounting legs, and a plurality of vibration reduction isolators; and
an exhaust after-treatment system configured to treat at least a portion of the exhaust stream that is directed to flow through the exhaust after-treatment system;
wherein the plurality of mounting legs are respectively attached at a plurality of different mounting locations to at least one of the engine or the platform on which the engine is supported, the base is attached to the plurality of legs and positioned above the engine, the plurality of isolators are attached to the base on a side of the base opposite where the legs are attached, and the exhaust after-treatment system is attached to the plurality of isolators above the base such that the plurality of isolators are interposed between the base and the exhaust after-treatment system for vibration reduction between the base and the exhaust after-treatment system.

8. The system of claim 7, wherein the isolators comprise at least one of wire mesh isolators or cable isolators.

9. A locomotive comprising the system of claim 8, wherein the engine, support structure, and exhaust after-treatment system are disposed in the locomotive.

10. The locomotive of claim 9, wherein the exhaust after-treatment system comprises a diesel particulate filter.

11. A locomotive comprising the system of claim 7, wherein the engine, support structure, and exhaust after-treatment system are disposed in the locomotive.

12. The locomotive of claim 11, wherein the exhaust after-treatment system comprises a diesel particulate filter.

13. A system comprising:
an engine supported on a platform and configured to produce an exhaust stream;
a support structure at least partially positioned above the engine and comprising a base, a plurality of mounting legs, and a plurality of vibration reduction isolators; and
an exhaust after-treatment system configured to treat at least a portion of the exhaust stream;
wherein the mounting legs are respectively attached at a plurality of different mounting locations to at least one of the engine or the platform on which the engine is supported, the base is attached to the plurality of legs and positioned above the engine, and the exhaust after-treatment system is attached to the base above the engine, and wherein the plurality of isolators are attached to lower ends of the plurality of legs and to the mounting locations on the at least one of the engine or the platform and interposed therebetween for vibration reduction between the exhaust after-treatment system and the at least one of the engine or the platform;
wherein the isolators comprise at least one of wire mesh isolators or cable isolators.

14. A locomotive comprising the system of claim 13, wherein the engine, support structure, and exhaust after-treatment system are disposed in the locomotive.

15. The locomotive of claim 14, wherein the exhaust after-treatment system comprises a diesel particulate filter.

* * * * *